(12) United States Patent
Shaikh

(10) Patent No.: US 11,446,636 B2
(45) Date of Patent: *Sep. 20, 2022

(54) JUTE STEM-SUPPORTED PALLADIUM-NPS AND USE AS DIP-CATALYSTS FOR AQUEOUS TRANSFER HYDROGENATION

(71) Applicant: KING FAHD UNIVERSITY OF PETROLEUM AND MINERALS, Dhahran (SA)

(72) Inventor: M. Nasiruzzaman Shaikh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,782

(22) Filed: Dec. 16, 2019

(65) Prior Publication Data

US 2022/0152587 A1 May 19, 2022

(51) Int. Cl.
*B01J 23/44* (2006.01)
*B01J 35/02* (2006.01)
(Continued)

(52) U.S. Cl.
CPC ............ *B01J 23/44* (2013.01); *B01J 23/42* (2013.01); *B01J 35/023* (2013.01); *B01J 37/04* (2013.01); *B01J 37/08* (2013.01)

(58) Field of Classification Search
CPC ..... C07C 2/861; C07C 15/52; C07C 2523/42; C07C 2523/44; C07C 2523/46;
(Continued)

(56) References Cited

U.S. PATENT DOCUMENTS 7,776,777 B2 * 8/2010 Kim .................. C01B 32/162
502/439
8,835,345 B2 * 9/2014 Moores ................ B01J 23/755
977/773

FOREIGN PATENT DOCUMENTS

CN 101264444 A 9/2008
CN 102527378 B 7/2013
(Continued)

OTHER PUBLICATIONS

M. Nasiruzzaman Shaikh, "Pd nanoparticles on green support as dip-catalyst: a facile transfer hydrogenation of olefins and N-heteroarenes in water", RSC Advances, vol. 9, Sep. 9, 2019, pp. 28199-28206.
(Continued)

*Primary Examiner* — Sharon Pregler
(74) *Attorney, Agent, or Firm* — Oblon, McClelland, Maier & Neustadt, L.L.P.

(57) ABSTRACT

Chemoselective and regioselective hydrogenation can be conducted using green sources, e.g., metal nanoparticles on plant stem supports in water. Heterogeneous catalytic systems, including "dip catalysts," can catalyze transfer hydrogenation of, e.g., styrenics, unfunctionalized olefins, quinolines, and other N-heteroaromatics. Palladium nanoparticles having longest dimensions of, e.g., 15 to 20 nm, may be anchored on jute plant (*Corchorus* genus) stem supports, i.e., "green" supports (GS). Pd nanoparticles can be decorated onto the jute stem (GS) by in-situ reduction of, e.g., $K_2PdCl_4$, in aqueous medium at 70° C., using formic acid as the reducing agent. The Pd-GS show uniform distribution of Pd on the cellulose matrix of the jute stem, and can conduct chemoselective transfer hydrogenation of numerous styrenics, olefins, and heterocycles (including aromatics) with high functional group tolerance, even in water.

10 Claims, 45 Drawing Sheets

(51) Int. Cl.
*B01J 37/08* (2006.01)
*B01J 37/04* (2006.01)
*B01J 23/42* (2006.01)

(58) Field of Classification Search
CPC ............ C07C 2523/50; C07C 2523/755; B01J 23/42; B01J 23/44; B01J 35/1019; B01J 35/1038; B01J 35/1061
See application file for complete search history.

(56) References Cited

FOREIGN PATENT DOCUMENTS

| | | |
|---|---|---|
| CN | 106432072 A | 2/2017 |
| CN | 106622327 B | 1/2019 |

OTHER PUBLICATIONS

Yongshen Ren, et al., "Selective hydrogenation of quinolines into 1,2,3,4-tetrahydroquinolines over a nitrogen-doped carbon-supported Pd catalyst", New Journal of Chemistry, vol. 42, Issue 20, Sep. 3, 2018, pp. 16694-16702 (Abstract only).

Xiang Hu, et al., "Pd-Supported N/S-Codoped Graphene-Like Carbons Boost Quinoline Hydrogenation Activity", ACS Sustainable Chemistry & Energy, vol. 7, No. 13, Jun. 4, 2019, pp. 11369-11376 (Abstract only).

Jessica M. Phillips, et al., "Chemoselective and Continuous Flow Hydrogenations in Thin Films Using a Palladium Nanoparticle Catalyst Embedded in Cellulose Paper", ACS Applied Bio Materials, vol. 2, No. 1, Dec. 20, 2018, pp. 488-494 (Abstract only).

Tao Song, et al., "Chemoselective transfer hydrogenation of $\alpha,\beta$-unsaturated carbonyls catalyzed by a reusable supported Pd nanoparticles on biomass-derived carbon", Catalysis Communications, vol. 120, Feb. 2019, pp. 80-85 (Abstract only).

Longkang Zhang, et al., "Ultrafine Pd Nanoparticles Anchored on Nitrogen-Doping Carbon for Boosting Catalytic Transfer Hydrogenation of Nitroarenes", ACS Omega, vol. 3, 2018, pp. 10843-10850.

Jie Li, et al., "Nitrogen-enriched porous carbon supported Pd-nanoparticles as an efficient catalyst for the transfer hydrogenation of alkenes", New Journal of Chemistry, vol. 42, Issue 20, Sep. 4, 2018, pp. 16823-16828 (Abstract only).

Attila Kunfi, et al., "Polydopamine supported palladium nanoparticles: Highly efficient catalysts in Suzuki cross-coupling and tandem Suzuki cross-coupling/nitroarene reductions under green reaction conditions", Journal of Catalysts, vol. 361, May 2018, pp. 84-93 (Abstract only).

\* cited by examiner

| Entry | Subst.[a] (R) | Solv. | THDB (equiv.) | Temp. (°C) | Time (h) | Conv.[b] (%) | Sel.[c] (%) | TOF (h$^{-1}$) |
|---|---|---|---|---|---|---|---|---|
| 1 |  | H$_2$O | 3.1 | 70 | 1 | 77 | >99 | 2851 |
| 2 | H | H$_2$O | 3.1 | 50 | 2 | 48 | 99 | 889 |
| 3 |  | MeOH | 3.1 | 70 | 1 | 30 | >99 | 1111 |
| 4[d] |  | H$_2$O | 3.1 | 70 | 1 | <8 | nd | nd |
| 5 | p-CH$_3$ | H$_2$O | 3.1 | 70 | 1 | >99 | >99 | 3704 |
| 6 | p OCH$_3$ | H$_2$O | 3.1 | 70 | 1 | 98 | >99 | 3630 |
| 7 | p-Cl | H$_2$O | 3.1 | 70 | 1 | >99 | >99 | 3704 |
| 8 | m-NO$_2$ | H$_2$O | 3.1 | 45 | 20 | >99 | <2 | 185 |
| 9 |  | THF | 1.1 | 45 | 24 | 48 | 81 | 74 |
| 10 |  | THF | 2.1 | 45 | 24 | 88 | 72 | 136 |
| 11 |  | DCM | 2.1 | 45 | 24 | 82 | 60 | 126 |
| 12 | o-Br | H$_2$O | 2.1 | 40 | 24 | >99 | <5 | 154 |
| 13 |  | DCM | 1.1 | 40 | 48 | 40 | 75 | 31 |
| 14 |  | THF | 1.1 | 40 | 48 | 89 | 82 | 69 |
| 15 |  | THF | 1.1 | 50 | 48 | 93 | 67 | 77 |

[a] 1 mmol of substrate with 3.1 mmol THDB with Pd@GS as catalyst
[b] measured by GC
[c] identified by GC-MS
[d] without Pd@GS but with 3 equivalent of THDB
nd = not determined.

| Entry | Substrate[a] | Product | Temp (°C) | Time (h) | Conv.[b] (%) | Sel.[c] (%) | TOF (h⁻¹) |
|---|---|---|---|---|---|---|---|
| 1 | cycloheptene | cycloheptane | 60 | 20 | >49 | >99 | 91 |
| 2 | trans-β-methylstyrene | (1-methyl-2-phenyl)ethane | 70 | 24 | 33 | >99 | 51 |
| 3 | methyl cinnamate | methyl 3-phenylpropanoate | 70 | 24 | 7 | >99 | 11 |
| 4 | methyl 2-acetamidoacrylate | methyl 2-acetamidopropanoate | 60 | 20 | >99 | >99 | 185 |

[a] 1 mmol with 4 mmol THDB in THF as solvent and 2 cm long strip of catalyst, Pd@GS
[b] measured by GC
[c] identified by GC-MS.

Fig. 19

| Entry | Catalyst | Substrate[a] | Product | Solv. | Time (min) | Conv.[b] (%) | Sel.[c] (%) | TOF (h$^{-1}$) |
|---|---|---|---|---|---|---|---|---|
| 1 | Pd@GS |  |  | H$_2$O | 120 | 85[d] | >99 | 1574 |
| 2 |  |  |  | H$_2$O | 40 | >99 | >99 | 4938 |
| 3 |  |  |  | DCM | 60 | nd | nd | nd |
| 4 |  |  |  | THF | 60 | nd | nd | nd |
| 5 |  |  |  | MeOH | 60 | 89 | nd | nd |
| 6 | Pd@GS |  |  | H$_2$O | 300 | >99 | >99 | 741 |
| 7 | Pd@GS |  |  | H$_2$O | 90 | 99 | >99 | 2640 |
| 8 | Pd@GS |  |  | H$_2$O | 120 | >99 | >99 | 1652 |
| 9 | Pd@GS |  |  | H$_2$O | 120 | 98 | >99 | 1815 |
| 10 | PdNPs |  |  | H$_2$O | 60 | >99 | >99 | 3667 |
| 11 | Pd/C |  |  | H$_2$O | 60 | 98 | >99 | 3593 |
| 12 | Pd@PVP |  |  | H$_2$O | 60 | 95 | >99 | 3518 |

[a] Substrate used 1 mmol and THDB 3.1 mmol at 60°C
[b] conversions were measured by GC
[c] identified by GC-MS
[d] reaction perfomed at 40°C
nd = not determined

JUTE STEM-SUPPORTED PALLADIUM-NPS AND USE AS DIP-CATALYSTS FOR AQUEOUS TRANSFER HYDROGENATION

STATEMENT OF ACKNOWLEDGEMENT

The inventors gratefully acknowledge the support from the National Plan for Science, Technology, and Innovation (MAARIFAH)-King Abdulaziz City for Science and Technology through the Science and Technology Unit at King Fand University of Petroleum and Minerals (KFUPM), Kingdom of Saudi Arabia, award number 15-NAN4650-04.

STATEMENT REGARDING PRIOR DISCLOSURES BY INVENTOR(S)

Aspects of the present disclosure are described in "Pd nanoparticles on green support as dip-catalyst: a facile transfer hydrogenation of olefins and N-heteroarenes in water," which was authored by the inventor and published online in *RSC Adv.* 2019, 9, 28199-28206, on Sep. 9, 2019, which is incorporated herein by reference in its entirety.

BACKGROUND OF THE INVENTION

Field of the Invention

The present disclosure relates to heterogeneous catalysts, particularly those disposed upon biologically generated and/or tolerated substrates, including catalysts suitable for transfer hydrogenation using, for example, palladium, and for methods of catalysis, esp. catalytic transfer hydrogenation, and methods of making such catalysts.

Description of the Related Art

Transition metal-mediated hydrogenation using Fe, Co, Ni, Pd, Pt, Rh, Ir, Ru, or Mo is a well-established procedure in research and industrial applications. However, this approach usually requires high hydrogen pressure, necessitating special equipment, and/or resulting in over-reduction or functional group intolerance of the substrate. To overcome these shortcomings, (catalytic) transfer hydrogenation is an alternative. In this context, considerable efforts have been devoted to designing Pd-supported transfer hydrogenation homogeneous catalysts.

Since transfer hydrogenation catalysts are typically well-dispersed at the molecular level, every individual catalytic entity can act as an active and accessible mechanistic site to which the reactant is exposed. This availability can lead to an overall high catalytic efficiency. Unfortunately, transfer hydrogenation catalysts can suffer from some serious drawbacks, such as cumbersome separation, voluminous toxic solvent use, and continuous loss of precious metal(s). Furthermore, the restricted reusability of transfer hydrogenation catalysts has often impeded their wide commercialization. Nevertheless, current environmental-related governmental legislation has begun to impose or already imposes severe restrictions on catalysts in an effort to eliminate toxic chemical processing and move towards the safer and greener technological endeavors.

Immobilization of the catalyst has been one avenue pursued amongst efforts to overcome these regulatory challenges. The activity of heterogeneous catalytic systems is often influenced by the nature of support. Hence, the prudent choice of support can be important to the activity, selectivity, turn-over rate, and/or other catalytic performance qualities. Silica, polymers, zeolites, alumina, magnetic nanoparticles, and carbon have emerged as excellent support systems. Some of these immobilized catalysts have reportedly achieved almost quantitative conversion and selectivity. Furthermore, the selection of support materials may be guided by particle size, shape, specific surface area, and/or porosity.

However, due to small size and high surface energy, the active metal nanoparticles tend to aggregate on the support, thereby lowering the number of accessible sites for the reactant. Aggregation can result in low catalytic activity and selectivity. Moreover, the facile leaching of nanoparticles from the surface of the support, due to weak binding, can restrict the prospect of reusability.

Recently, a great deal of attention has been devoted to developing solid supports from biomass, such as activated carbon, carbon nanofibers and hydrophilic carbons, as such biomass-based supports are considered as sustainable support materials in heterogeneous catalysis. Among these, activated carbon supports have been widely used as metal nanoparticle anchors for catalytic applications, yielding relatively discouraging performance. The major reasons for the failure or dissatisfactory results from activated carbon supports have been hypothesized to be poor pore connectivity, resulting in limited mass-transfer and longer diffusion times; a lack of proper functional groups on the support, hindering the metal nanoparticle interaction with the support; and hydrophobic surfaces in activated carbons.

Cognizant of difficulties in support-catalytic metal interactions, a new concept of the "dip-catalyst" has emerged in hopes of achieving better efficiency, high turnover frequency (TOF), ease of fabrication, higher reusability, and/or greener synthesis routes. The term "dip-catalyst" refers to a catalyst that provides convenient deployment, high recyclability, and easy insertion/removal from a reaction medium such that a catalytic reaction can be toggled on-off almost instantaneously. The technology of "dip-catalysis" has remained largely unexplored to date. However, a limited number of reports on fabricating "dip-catalysts" have appeared in recent literature, including Pd-PVA-based thin films with high catalytic activity and reusability, a composite material of metal ions on filter paper with good activity and recyclability, and dispersed Pd nanoparticles on cellulose acetate successful in C—C bond formation reaction.

Encouraged by distinctive potential advantages over the conventional support-based catalysts, including improved activity and excellent recyclability, the development of such heterogeneous catalysts has continued.

U.S. Pat. No. 8,835,345 to Moores et al. (Moores) discloses a catalyst comprising metal nanoparticles supported on nanocrystalline cellulose and a homogeneous catalyst system comprising this catalyst colloidally suspended in a fluid, as well as methods of making and using this catalyst. Moores's metal may comprise palladium, nickel, ruthenium, platinum, and/or silver, have a diameter of 2 to 10 nm, and be 0.5 to 5 wt. % of the cellulose, which cellulose may be form of whiskers having a length ranging from 100 to 300 nm and a width of 5 to 15 nm. Moores's cellulosic material may be synthesized by acid hydrolysis of wood pulp, and Moores does not indicate that its catalysts are suitable for transfer hydrogenation, nor olefin reduction, instead requiring overpressures of at least 4 bar $H_2$. Moores does not mention jute, let alone jute stems.

CN 106432072 A by Bao et al. (Bao) discloses the preparation of substituted 1,2,3,4-tetrahydroquinoline taking quinoline and its derivatives as raw materials, taking a nanoporous palladium as a catalyst, taking hydrogen as a hydrogen source, and carrying out selective hydrogenation to prepare 1,2,3,4-tetrahydroquinoline, at $H_2$ pressures of 0.1 to 20.0 MPa. Bao's catalyst porous framework size is 1 to 50 nm, and Bao uses molar ratios of quinoline to catalyst of 1 to 0.01:1 to 0.5. Bao uses reaction temperatures of −50 to 150° C. and reaction times of 12 to 36 hours. Bao does not describe a cellulosic support, nor jute.

CN 102527378 B by Tang et al. (Tang) discloses a monodisperse spherical porous palladium nanocatalyst made by: dripping a 10 to 15 mM ascorbic, formic, or acetic acid solution into a $K_2PdCl_4$ solution at 1.25 to 12.5 mM in an ice bath while stirring, then sonicating for 5 to 15 minutes at 35 to 45° C. The molar ratio of the $K_2PdCl_4$ to acid is 0.5 to 3:1. Tang does not use any cellulose material, e.g., jute stem, nor does Tang disclose catalytic transfer hydrogenation.

CN 101264444 A by Fan et al. (Fan) discloses a preparation for $TiO_2$-loaded palladium selective hydrogenation catalyst made by dipping $TiO_2$ into a $H_2PdCl_4$ solution to obtain $Pd/TiO_2$ powder catalyst after baking, dechlorinating, and hydrogen high-temperature reduction. Fan uses an alumina sol as a cementing agent for the $Pd/TiO_2$ powder catalyst, to make catalyst with norm shape after extrusion, and curing under inert gas. Fan uses 0.3 wt. % Pd (or 2.25 mol. % starting material Pd) relative to $TiO_2$, along with 2 wt. % methylcellulose with respect to the $TiO_2$. Fan does not disclose lignin-containing materials, nor jute.

CN 106622327 B to Chen et al. (Chen) discloses a catalyst composed of 0.1 to 30 wt. % of metal particles and 70 to 99.9 wt. % of bio-N-doped porous carbon carrier, useful for catalyzing aqueous phase hydrogenation of biofurfural to selectively prepare furfural alcohol or cyclopentanone. Chen's metal may be Pd, Au, Ag, Pt, Rh, Ru, and/or Ir. Chen's nitrogen-doped porous carbon may be prepared from sweet potato leaves, glutinous rice, dandelion leaves, yellow flower seedling leaves, jute leaves, burdock leaves, asparagus, bamboo shoots, white cauliflower, spinach, or broccoli. However, Chen does not describe lignin-containing materials, or jute stems, as a catalyst support. Chen also fails to disclose transfer hydrogenation and uses 0.1 to 10 MPa of $H_2$.

*New J. Chem.* 2018, 42, 16694-16702 by Ren et al. (Ren) discloses a method of hydrogenating quinolines to 1,2,3,4-tetrahydroquinolines over a porous nitrogen-doped carbon-supported Pd catalyst. Ren's mesoporous support is prepared by the pyrolysis of glucose and melamine using eutectic salts of KCl and $ZnCl_2$ as the porogen, and has high nitrogen content. The Pd nanoparticles are homogeneously dispersed on the surface of nitrogen-doped carbon materials with an size of 1.9 nm in a narrow size distribution. Ren uses 20 bar $H_2$ to reduce quinoline sot 1,2,3,4-tetrahydroquinolines with yields of 86.6 to 97.8%. Ren does not disclose transfer hydrogenation, nor lignin-containing cellulosic support materials.

*ACS Sustainable Chem. Eng.* 2019, 7(13), 11369-11376 by Hu et al. (Hu) discloses ~2.1 nm Pd nanoparticles supported on biomolecule-derived graphene-like carbons have as catalysts for the selective hydrogenation of quinolines. Hu pyrolyzes guanine with $H_2SO_4$, yielding heteroatom-doped (N/O, N/O/S) and minimally layered carbon nanosheets with large accessible areas, which can facilitate mass transfer and stabilize Pd nanoparticles. Hu's catalyst contains $Pd^0$ and $Pd^{2+}$ and N and/or S codoping in graphene-like carbons. Hu's support material does not contain lignin-containing material, much less jute stem.

In light of the above, a need remains for catalysts capable of transfer hydrogenation using renewable materials, such as jute stem or other lignin-containing materials, particularly for palladium-containing catalysts on heterogeneous supports, such as palladium nanoparticles-containing dip catalysts, and methods of making and using such catalysts, particularly in transfer hydrogenation.

SUMMARY OF THE INVENTION

Aspects of the invention provide catalysts comprising: a solid support matrix comprising 20 to 60 wt. % α-cellulose and 10 to 35 wt. % lignin, based on a total support matrix weight; and a catalytic material comprising palladium and/or platinum disposed on the support matrix, wherein the palladium and/or platinum is present in an amount in a range of from 0.005 to 0.5 wt. %, relative to a total weight of the catalyst. Such catalysts may be modified by any permutation of the features described herein, particularly the following.

The 20 to 60 wt. % α-cellulose and 10 to 35 wt. % lignin may be from jute stems. The support matrix may comprise 10 to 30 wt. % hemicellulose, based on the total support matrix weight. The support matrix may comprise 30 to 50 wt. % α-cellulose, 15 to 30 wt. % lignin, and/or 15 to 25 wt. % hemicellulose, based on the total support matrix weight. The support matrix may comprise at least 90 wt. % jute stems, based on the total support matrix weight.

The catalyst may comprise palladium and/or, e.g., at least 90 wt. % palladium, relative to total metal weight in the catalyst, and/or at least 90 at. % of the palladium may be in elemental state. The catalyst may comprise platinum and/or, e.g., at least 90 wt. % platinum, relative to total metal weight in the catalyst, and/or at least 90 at. % of the platinum may be in elemental state. The palladium and/or platinum may be present as nanoparticles having an average particle size in a range of from 10 to 40 nm.

Aspects of the invention provide methods of preparing any permutation of the inventive catalyst described herein, which methods may comprise: mixing the support matrix and a catalyst precursor comprising a palladium and/or platinum salt in a solution, such as an aqueous solution or an organic solution, to form a suspension; treating the suspension with a reducing agent to form a mixture; and reducing the mixture to form the catalyst in wet form, and optionally drying at ambient temperature and/or above. Such methods may be modified by any permutation of the features described herein.

The palladium and/or platinum salt may comprise $K_2PdCl_4$ and/or $K_2PtCl_4$. The reducing may comprise heating at a temperature in a range of from 35 to 90° C. for a reaction time in a range of from 0.5 to 4 hours.

Aspects of the invention provide methods of conducting a catalytic transfer hydrogenation, which methods may comprise: contacting a substrate with any permutation of the inventive catalyst(s) described herein in the presence of a reducing agent, thereby at least partially reducing a reducible group on the substrate. The methods may be conducted in an atmosphere of no more than 5 vol. % $H_2$, relative to total reaction atmosphere gases. Such methods may be modified by any permutation of the features described herein.

The reducing agent may comprise a phosphinic acid, a phosphinate, a phosphite, hydrazine, a hydride of boron, a hydride of aluminum, a hydride of silicon, a hydride of tin, cyclohexene, a substituted cyclohexene, 1,3-cyclohexadiene, 1,4-cyclohexadiene, trans-$\Delta^2$-octalin, $\Delta^{9,10}$-octalin, 1-methyloctalin, trans-2-methyloctalin, tetralin, 1,6-dimethyltetralin, 6-methyltetralin, d-limonene, α-pinene, β-pinene, $\Delta^3$-carene, α-phellandrene, β-phellandrene, terpinolene, Δ¹-p-menthene, cadalene, pulegone, selinene, ammonium formate, formic acid, triethylammonium formate, hydrazinium monoformate, hydrazine, and/or diimide (diazene). The reducing agent may comprise tetrahydroxydiboron.

The substrate may comprise an aromatic alkene, an aliphatic alkene, and/or a nitrogen-containing heterocycle. The substrate may comprise a styrene, such as styrene, p-methylstyrene, m-methylstyrene, o-methylstyrene, p-methoxystyrene, m-methoxystyrene, o-methoxystyrene, m-nitrostyrene, o-bromostyrene, o-chlorostyrene, o-iodostyrene, m-bromostyrene, m-chlorostyrene, m-iodostyrene, p-bromostyrene, p-chlorostyrene, p-iodostyrene, or the like, the alkyl stilbene may include, e.g., trans-methylstilbene, methyl acetamidoacrylate, ethyl trans-b-methylcinnamate, a cycloheptene, a cyclooctene, a quinoline, an isoquinoline, an acridine, a pyrrole, a pyridine, and/or a pyrazine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 19 shows a table of the hydrogenation using an exemplary inventive Pd-GS catalyst on cyclic and acylic polysubstituted alkenes in THF.

DETAILED DESCRIPTION OF THE INVENTION

Figure 1:
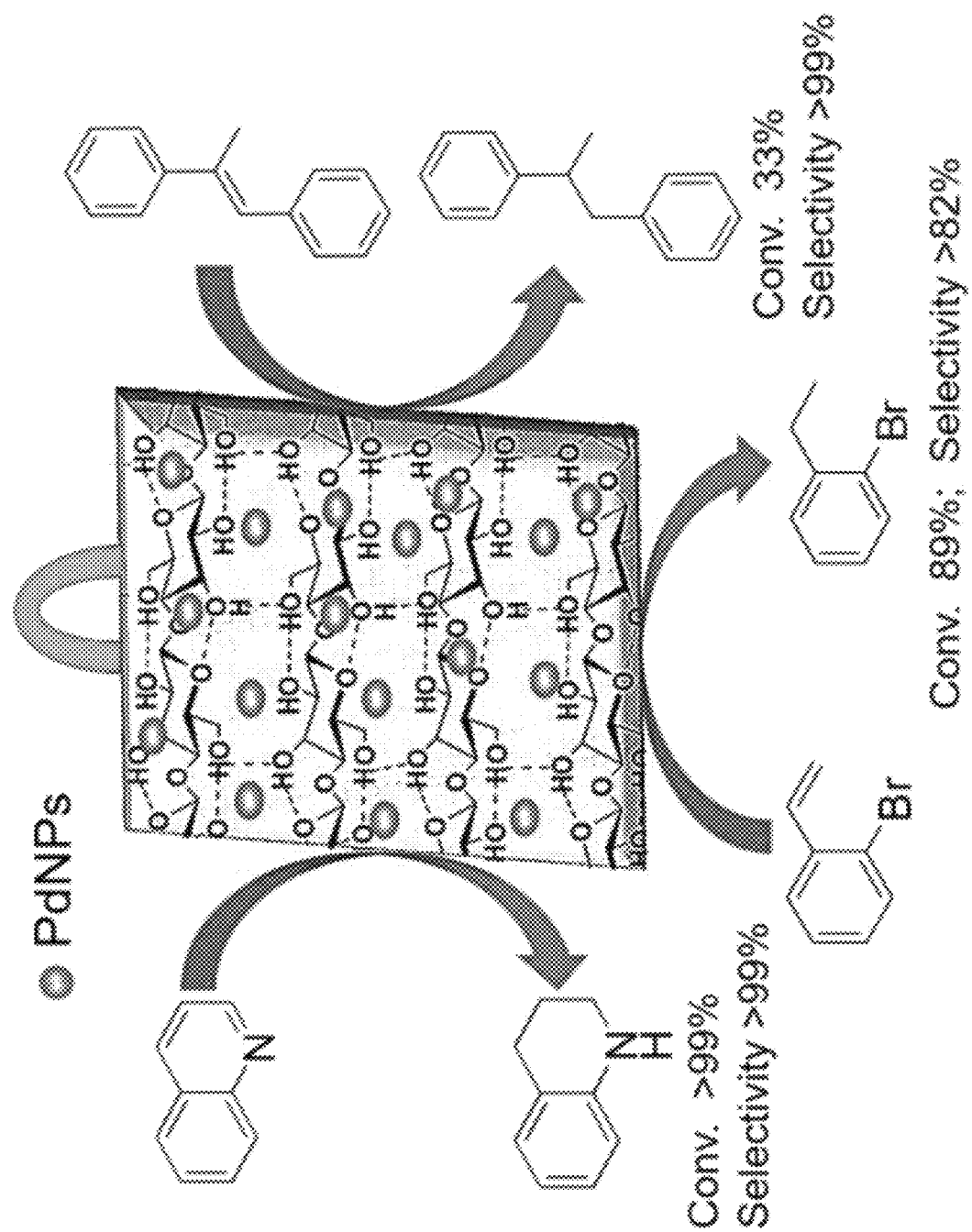
FIG. 1 shows a graphical representation of the theoretical structure and the versatility of inventive palladium nanoparticles on "green support" (Pd-GS or Pd@GS) catalysts as "dip catalysts"

Aspects of the invention provide catalysts comprising: a solid support matrix comprising 20 to 60 wt. % (e.g., at least 20, 22, 24, 26, 28, 30, 32, 34, 36, 38, or 40 wt. % and/or up to 60, 58, 56, 54, 52, 50, 48, 46, 44, 42, or 40 wt. %) α-cellulose and 10 to 35 wt. % (e.g., at least 10, 12.5, 15, 17.5, 20, 21, 22, 22.5, 23, 23.5, 24, 24.5, or 25 wt. % and/or up to 35, 32.5, 30, 29, 28, 27.5, 27, 26.5, 26, 25.5, 25, 24.5, 24, 23.5, 23, 22.5, 22, 21.5, 21, 20.5, or 20 wt. %) lignin, based on a total support matrix weight; and a catalytic material comprising palladium and/or platinum disposed on the support matrix, wherein the palladium and/or platinum is present in an amount in a range of from 0.005 to 0.5 wt. %, e.g., at least 0.005, 0.01, 0.025, 0.0333, 0.04, 0.045, 0.05, 0.055, 0.06, 0.067, 0.075, 0.1, 0.2, 0.25, 0.033, 0.04, 0.05, 0.075, 0.0875, 0.1, 0.1125, 0.125, 0.1375, 0.15, 0.1625, 0.175, 0.1875, 0.2, 0.2125, 0.225, 0.2375, 0.25, 0.2625, 0.275, 0.2875, 0.3, 0.325, 0.33, 0.35, 0.375, 0.4, 0.425, 0.45, 0.475, 0.5 wt. % and/or up to 1, 0.75, 0.67, 0.5, 0.4875, 0.475, 0.4625, 0.45, 0.4375, 0.425, 0.4125, 0.4, 0.3875, 0.375, 0.3625, 0.35, 0.3375, 0.325, 0.3125, 0.3, 0.2875, 0.275, 0.2625, 0.25, 0.2375, 0.225, 0.2125, 0.2, 0.1875, 0.175, 0.1625, 0.15, 0.1375, 0.125, 0.1125, or 0.1 wt. %, relative to a total weight of the catalyst.

The 20 to 60 wt. % (or any percentage or range described above) α-cellulose and 10 to 35 wt. % (or any percentage or range described above) lignin may be from jute stems, either as a portion, e.g., at least 75, 80, 85, 90, 91, 92, 92.5, 93, 94, 95, 96, 97, 97.5, 98, 99, 99.1, 99.5, or 99.9 wt. %, or all of the matrix material. The support matrix may comprise 10 to 30 wt. % hemicellulose, e.g., at least 10, 12, 14, 16, 17.5, 18, 19, 20, 20.5, 21, 21.5, 22, 22.5, 23, 23.5, 24, 24.5, or 25 wt. % and/or up to 30, 28, 27.5, 27, 26.5, 26, 25.5, 25, 24.5, 24, 23.5, 23, 22.5, 22, 21.5, 21, 20.5, or 20 wt. %, based on the total support matrix weight. The support matrix may comprise 30 to 50 wt. % or 35 to 45 wt. % or 37.5, to 42.5 wt. % (or any percentage or range described above) α-cellulose, 15 to 30 wt. % or 17.5 to 27.5 wt. % or 20, to 25 wt. % (or any percentage or range described above) lignin, and/or 15 to 25 wt. % or 18 to 24 wt. % or 20 to 22.5 wt. % (or any percentage or range described above) hemicellulose, based on the total support matrix weight. The support matrix may comprise at least 90, 91, 92, 92.5, 93, 94, 95, 96, 97, 97.5, 98, 99, 99.1, 99.5, or 99.9 wt. % jute stems, based on the total support matrix weight.

The catalyst may comprise palladium and/or, e.g., at least 90, 91, 92, 92.5, 93, 94, 95, 96, 97, 97.5, 98, 99, 99.1, 99.5, or 99.9 wt. % palladium, relative to total metal weight in the catalyst, and/or at least 90, 91, 92, 92.5, 93, 94, 95, 96, 97, 97.5, 98, 99, 99.1, 99.5, or 99.9 at. % of the palladium may be in elemental state. The catalyst may comprise platinum and/or, e.g., at least 90, 91, 92, 92.5, 93, 94, 95, 96, 97, 97.5, 98, 99, 99.1, 99.5, or 99.9 wt. % platinum, relative to total metal weight in the catalyst, and/or at least 90, 91, 92, 92.5, 93, 94, 95, 96, 97, 97.5, 98, 99, 99.1, 99.5, or 99.9 at. % of the platinum may be in elemental state. The palladium and/or platinum may be present as nanoparticles having an average particle size in a range of from 10 to 40 nm, e.g., at least 10, 11, 12, 12.5, 13, 14, 15, 16, 17, 17.5, 18, 19, or 20 nm and/or up to 40, 35, 30, 27.5, 25, 22.5, 20, 19, 18, 17.5, 17, 16, or 15 nm.

Aspects of the invention provide methods of preparing any permutation of the inventive catalyst described herein, which methods may comprise: mixing the support matrix and a catalyst precursor comprising a palladium and/or platinum salt in a solution, such as an aqueous solution or an organic solution, to form a suspension; treating the suspension with a reducing agent to form a mixture; and reducing the mixture to form the catalyst in wet form, and optionally drying at ambient temperature and/or above. The solvent for the mixing may preferably be water in circumstances where environmentally tolerable solvents are a priority, though the solvent for the making and/or transfer hydrogenation may be any in which the reaction can technically occur, e.g., pyridine, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pet ether, pentane, hexane(s), cyclohexane, decane(s), decalin, THF, dioxane, benzene, toluene, xylene(s), o-dichlorobenzene, diethyl ether, methyl t-butyl ether, diisopropyl ether, ethylene glycol, methanol, ethanol, isopropanol, propanol, n-butanol, and/or water.

The palladium and/or platinum salt may comprise $K_2PdCl_4$ and/or $K_2PtCl_4$. The reducing may comprise heating at a temperature in a range of from 35 to 90° C., e.g., at least 35, 37.5, 40, 42.5, 45, 47.5, 50, 52.5, 55, 57.5, 60, 62.5, 65, 67.5, 70° C. and/or up to 90, 87.5, 85, 82.5, 80, 77.5, 75, 72.5, 70, 67.5, 65, 62.5, 60° C., for a reaction time in a range of from 0.5 to 4 hours, e.g., at least 0.5, 0.75, 1, 1.25, 1.5, 1.75, 2, 2.25, or 2.5 hours and/or up to 4, 4.75, 4.5, 4.25, 4, 3.75, 3.5, 3.25, 3, 2.75, 2.5, 2.25, or 2 hours.

Aspects of the invention provide methods of conducting a catalytic transfer hydrogenation, which methods may comprise: contacting a substrate with any permutation of the inventive catalyst(s) described herein in the presence of a reducing agent, thereby at least partially reducing a reducible group on the substrate. The contacting may take place under flow and/or under batch circumstances. While the exemplary support pieces may be 2×0.5×0.1 cm, the support material may have any dimension, typically facilitating filtration of the heterogeneous catalyst from solution, e.g., with a longest dimension of, e.g., up to 30, 25, 20, 18, 16, 14, 12, 10, 9, 8, 7.5, 7, 6, 5, 4, 3.5, 3, 2.5, 2, 1.5, 1, 0.75, or 0.5 cm, and/or with an aspect ratio (longest dimension/width dimension and/or longest dimension/thickness dimension) of 30, 25, 20, 15, 12, 10, 8, 6, 5, 4, 3, 2, or 1. The supports may be fin or slab shaped, baffle shaped (e.g., for insertion on the side of a reactor), square cubic, spherical/spheroid, irregular, rectangular prismatic, or the like. The transfer hydrogenation methods may be conducted in an atmosphere of no more than 5, 4, 3, 2.5, 2, 1, 0.5, 0.1, 0.01, 0.005, 0.001, 0.0005, 0.0001, 0.00005, or 0.00001 vol. % $H_2$, relative to total reaction atmosphere gases, or may occur in a substantial or complete (as technically feasible) absence of $H_2$.

The reducing agent may comprise a phosphinic acid, a phosphinate, a phosphite, hydrazine, a hydride of boron, a hydride of aluminum, a hydride of silicon, a hydride of tin, cyclohexene, a substituted cyclohexene, 1,3-cyclohexadiene, 1,4-cyclohexadiene, trans-$\Delta^2$-octalin, $\Delta^{9,10}$-octalin, 1-methyloctalin, trans-2-methyloctalin, tetralin, 1,6-dimethyltetralin, 6-methyltetralin, d-limonene, α-pinene, β-pinene, $\Delta^3$-carene, α-phellandrene, Δ-phellandrene, terpinolene, $\Delta^1$-p-menthene, cadalene, pulegone, selinene, ammonium formate, formic acid, triethylammonium formate, hydrazinium monoformate, hydrazine, and/or diimide (diazene). The reducing agent may comprise at least 75, 80, 85, 90, 92.5, 95, 97.5, 98, 99, 99.1, 99.5, or 99.9 wt. % tetrahydroxydiboron, based on.

The substrate may comprise an aromatic alkene, an aliphatic alkene, and/or a nitrogen-containing heterocycle. The substrate may comprise a styrene, such as styrene, p-methylstyrene, m-methylstyrene, o-methylstyrene, p-methoxystyrene, m-methoxystyrene, o-methoxystyrene, m-nitrostyrene, o-bromostyrene, o-chlorostyrene, o-iodostyrene, m-bromostyrene, m-chlorostyrene, m-iodostyrene, p-bromostyrene, p-chlorostyrene, p-iodostyrene, or the like, the alkyl stilbene may include, e.g., trans-methylstilbene, methyl acetamidoacrylate, ethyl trans-b-methylcinnamate, a cycloheptene, a cyclooctene, a quinoline, an isoquinoline, an acridine, a pyrrole, a pyridine, and/or pyrazine. The substrate may also contain (i) a nitro group, a nitroso group, a nitrile, a bromide, an iodide, a chloride, a fluoride, an olefinic bond, and/or an acetylenic bond; (ii) a ketone and/or an aldehydes; and/or (iii) (hetero)aromatic ring bonds, on any of an alkyl or aromatic compound, cyclic, linear, or branched. Inventive catalysts and/or methods may be tailored to focus on any of these aforementioned reduction-prone groups, e.g., at least 50, 60, 70, 75, 80, 85, 90, 91, 92, 92.5, 93, 94, 95, 96, 97, 97.5, 98, 99, 99.1, 99.5, or 99.9% chemoselectively.

Inventive catalysts are suitable to reduce olefins and/or heteroaromatic compounds using pressures of less than 4, 3.75, 3.5, 3.25, 3, 2.75, 2.5, 2.25, 2, 1.75, 1.5, or 1.25 bar, or even under ambient pressure.

Inventive catalysts may avoid silica, titania, ceria, zirconia, pseudo-boehmite, boehmite, and/or alumina, or may comprise no more than 40, 33, 25, 20, 15, 10, 7.5, 5, 4, 3, 2, 1, 0.5, or 0.1 wt. %, relative to the total support weight, of silica, titania, ceria, zirconia, pseudo-boehmite, boehmite, and/or alumina, individually or in combination. Inventive catalysts may comprise supports containing no more than 15, 10, 7.5, 5, 4, 3, 2.5, 2, 1, 0.5, 0.1, 0.01, 0.001, 0.0001, or 0.00001 at. % of N and/or S, relative to the total C—N—H—O—S content in the support, individually or in combination.

Useful palladium and/or platinum salts for making the inventive catalysts may include Na, K, Mg, Li, and/or $NH_4$ salts of tetrachloropalladate(II), hexachloropalladate(IV), tetrachloroplatinate(II), hexachloroplatinate(IV), tetracyanopalladate(II), etc., such as $K_2PdCl_4$, $K_2PdCl_6$, $K_2PtCl_4$, $K_2PtCl_6$, $Na_2PdCl_4$, $Na_2PdCl_6$, $Na_2PtCl_4$, $Na_2PtCl_6$, $Li_2PdCl_4$, $Li_2PdCl_6$, $Li_2PtCl_4$, $Li_2PtCl_6$, $(NH_4)_2PdCl_4$, $(NH_4)_2PdCl_6$, $(NH_4)_2PtCl_4$, $(NH_4)_2PtCl_6$, $K_2Pd(CN)_4$, $K_2Pd(CN)_6$, $K_2Pt(CN)_4$, $K_2Pt(CN)_6$, etc. Further useful salts may contain one ore more of nitrate, chloride, bromide, iodide, acetate, formate, priopionate, trifluoroacetate, tetrafluoroborate, triflate, methansulfonate, benzenesulfonate, tosylate, sulfate, cyanide, etc., such as (ethylenediamine)palladium (II) chloride, (ethylenediamine)platinum(II) chloride, palladium(II) bromide, platinum(II) bromide, palladium(II) chloride, platinum(II) chloride, palladium(II) cyanide, platinum (II) cyanide, palladium(II) iodide, platinum(II) iodide, palladium(II) nitrate, platinum(II) nitrate, palladium(II) sulfate, platinum(II) sulfate, tetraamminepalladium(II) bromide, tetraammineplatinum(II) bromide, tetraamminepalladium(II) chloride, tetraammineplatinum(II) chloride, etc.

Aspects of the invention include "dip-catalysts" comprising Pd nanoparticles supported on bio-processed jute stem (referred to as Pd@GS or Pd-GS), which may be particularly suited the transfer hydrogenation of olefins, quinolines, and other N-heteroarenes, even in water. Aspects of the invention provide Pd-nanoparticle on bio-processed jute stems having excellent conversion and/or selectivity over sensitive organic functional group(s), e.g., halides (Cl, Br, and/or I), hydroxyl groups, nitriles, thiocyanates, isocyanates, sulfides, etc., and/or reusability for tens of consecutive cycles, e.g., without more than 50, 60, 70, 75, 80, 85, 90, 92.5, 95, 97.5, 98, 99, or 99.5% of the conversion and/or selectivity.

Aspects of the invention include dip catalysts comprising, e.g., at least 75, 80, 85, 90, 91, 92, 92.5, 93, 94, 95, 96, 97, 97.5, 98, 99, 99.1, 99.5, or 99.9 wt. % of the total weight of the catalytic metals, of Pd nanoparticles supported on the naturally-occurring surface architecture of jute stick, which may be used in transfer hydrogenation activity under mild conditions in water, e.g., at a pressure of no more than 5, 4.5, 4, 3.5, 3, 2.75, 2.5, 2.25, 2, 1.75, 1.5, 1.25, 1.2, 1.15, 1.1, or 1.05 bar-a, such as ambient pressure or even below ambient pressure, and/or at a temperature of no more than 75, 70, 65, 60, 55, 50, 45, 40, or 35° C., even at ambient temperature or with pure solar-generated heat, and/or in an atmosphere of air or argon or nitrogen. Aspects of the invention exploit the natural cellulosic surface provided by jute sticks for a favorable interaction for Pd nanoparticles. Inventive dip catalysts may be employed for chemoselective transfer hydrogenation of olefins with excellent (e.g., at least 75, 80, 85, 90, 91, 92, 92.5, 93, 94, 95, 96, 97, 97.5, 98, 99, 99.1, 99.5, 99.9, 99.99, 99.999, or 99.9999%) conversion and good organic functional group tolerance (e.g., —F, —Cl, —Br, —I, —OH, —SH, —SCN, —CNO, —NO$_2$, —OR, —SR, —COOH, —COOR, —RO$_2$R, —NH$_2$, —NHR, —NR$_2$, and/or —NO, R being alkyl or aryl) using tetrahydroxydiboron (THDB), and provided high turn-over frequency (TOF). Aspects of the invention comprise selectively and/or quantitatively hydrogenating quinoline(s) and other N-heteroaromatic compounds at 60° C., or, for example, at least 40, 42.5, 45, 47.5, 50, 52.5, 55, 57.5, 60, 62.5, 65, 67.5, 70, 72.5, or 75° C. and/or up to 80, 77.5, 75, 72.5, 70, 67.5, 65, 62.5, 60, 57.5, 55, 52.5, 50, 47.5, or 45° C., within a short span of time (e.g., at least 10, 15, 20, 25, 30, 35, 40, 45, 50, 55, or 60 minutes and/or no more than 120, 110, 100, 90, 80, 70, 60, 55, 50, 45, 40, 35, or 30 minutes) under ambient pressure.

Aspects of the invention may provide catalysts with stability, i.e., maintaining at least 90, 95, 97.5, 98, 99, 99.5, or 99.9% of original activity (turn-over frequency, conversion rate, and/or selectivity) used over 25, 30, 32, 34, 36, 38, 40, 42, 44, 46, 48, 50 or more consecutive cycles and/or without adversely affecting its original reactivity and/or surface morphology and/or chemical composition, e.g., more than 99, 97.5, 95, 92.5, 90, 85, 80, or 75% (mol. %, at. %, or wt. %). Aspects of the invention can advantageously reduce and/or eliminate catalyst monitoring, insertion, and/or removal between the cycles, as well as naturally-occurring support sourcing, ease of handling, low cost fabrication, convenient deployment, favorable organic functional groups on support providing enhanced stability, good conversion, chemoselectivity, tolerance of water as reaction medium, and/or reusability. Aspects of the invention may provide (substantially) environmentally benign catalyst fabrication. Aspects of the invention may provide catalytic transfer hydrogenation activity, e.g., for olefins and N-heteroarenes (N-heteroaromatics, and even O-heteroaromatics, P-heteroaromatics, and/or S-heteroaromatics). Aspects of the invention may provide new or alternate routes for developing catalysts with Pd or other metal nanoparticles (Pt, Rh, Re, W, Ir, Ru, Ni, V, Hg, etc.) for various catalytic transformations.

EXPERIMENTAL

Materials and methods: all chemicals were purchased from Sigma-Aldrich and were used as-received unless otherwise stated. Standard procedures were followed for the dry and deoxygenated solvents. Schlenk line techniques were used to carry out reactions under inert atmosphere wherever needed. Deionized (DI) water (specific conductivity: 18.2 MΩ) was used in all the experiments. Fourier-transform infrared (FT-IR) spectroscopic data were recorded on a Nicolet 720 instrument in the wave number range of 500 to 4000 cm$^{-1}$, using ATR. The transmission electron microscopy (TEM) samples were prepared by dropping an ethanolic suspension on a copper grid and drying at room temperature. The amount of Pd in the catalyst was determined by inductively coupled plasma optical emission spectrometry (ICP-OES) using a PlasmaQuant PO 9000 instrument from Analytik Jena.

The samples were first digested in a dilute mixture of HNO$_3$ and HCl. Calibration curves were prepared for Pd using ICP Element Standard solutions from Merck. Samples for scanning electron microscopy (SEM) imaging on a Tescan Lyra 3 instrument were prepared from a chunk of decorated jute stem on alumina stubs and coated with gold in a Quorum Q150T E automatic gold coater. For elemental analysis and mapping, the energy dispersive x-ray spectra (EDS) were collected on a Lyra 3 attachment, using an Oxford Instruments spectroscope. Catalytic products were identified by a Shimadzu 2010 Plus gas chromatograph attached with a mass spectrometer (GC-MS) from Japan. The disappearance of the reactant and sequential appearance of the product were recorded in real time, identifying the species in terms of their molecular ion (M+) by comparing and matching them with the available Wiley mass spectrum database library, in addition to the identification of mass fragments.

Figure 2:
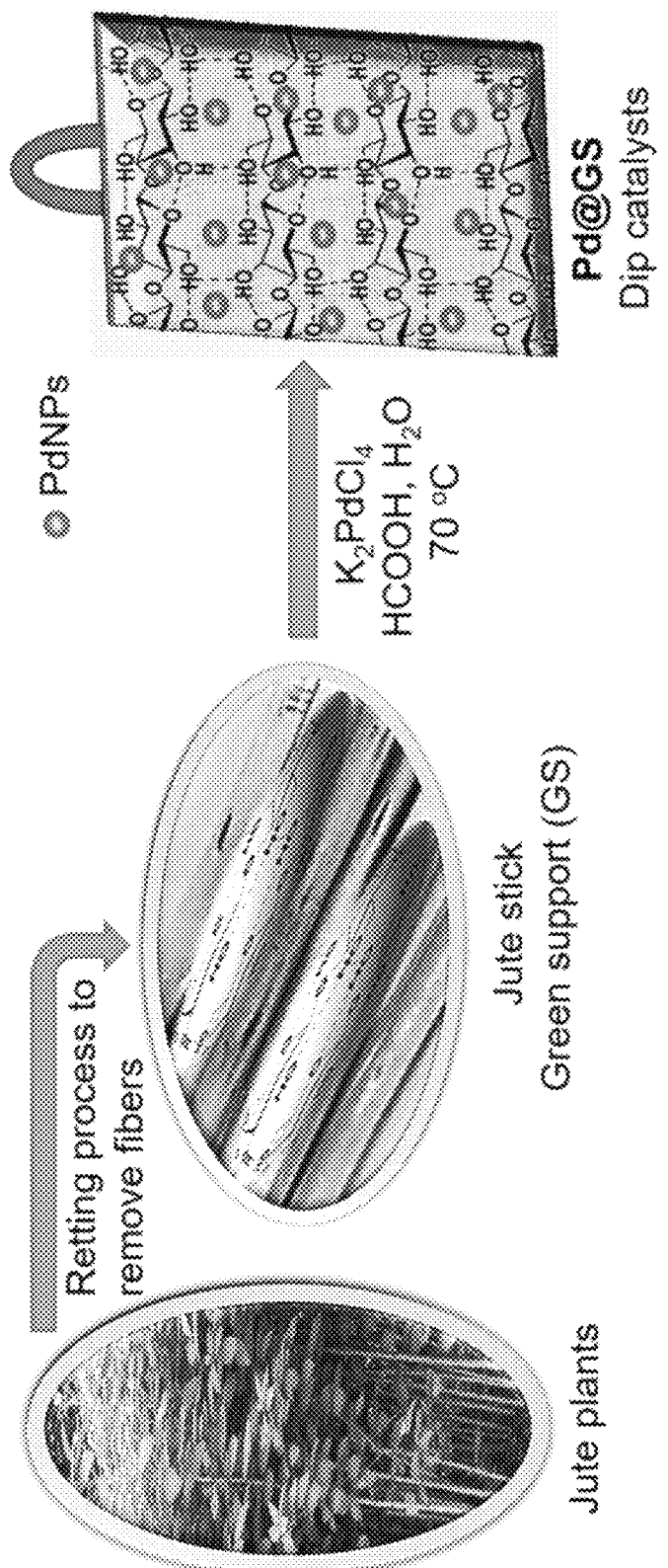
FIG. 2 shows a schematic illustration for an exemplary synthesis of inventive Pd-GS materials.

Synthesis of Pd-GS: Jute plants are usually harvested after they bloom. The fully grown stalks are cut, trimmed, bundled, and kept immersed in ponds or stream to rot (known as retting). The retting frees the fibers from the stem, and the stems are removed manually. The stems are dried for 7 days in sunlight, cut into thin slices, for example, ~2 cm×0.5 cm×0.1 cm, and dried in an oven at 100° C. for 5 hours. Pd nanoparticles with average longest dimensions (often diameters) in the range of 15 to 20 nm were prepared on jute stem as described below and its schematic illustration is shown in FIG. 2.

Synthesis

The fully grown jute was cut and trimmed. Stems were extracted through the retting process. Since the jute stick has highly fibrous, porous, lightweight, voluminous, and woody structure, jute stick has a high surface area. About 3 million tons of jute sticks are produced annually in India. Jute stick is economically affordable and a biodegradable green precursor. The jute stem is a lignocellulosic raw material, composed of α-cellulose (40.8%), hemicellullose (22.10%), lignin (23.5%), and other components. The anchoring of Pd nanoparticles was achieved by immersing the jute strips, which contain a large number of primary and secondary hydroxyl groups, into potassium tetrachloropalladate (K$_2$PdCl$_4$) solution in deionized water and allowing it to be sufficiently soaked in the metal precursor solution for 2 hours. The yellow palladium precursor was reduced in-situ to black Pd nanoparticles by using formic acid as reducing agent at 70° C.

The Pd content of each strip was quantified by inductively coupled plasma-optical emission spectrometry (ICP-OES). Desirable amounts of palladium nanoparticles were measured by varying the concentration of the K$_2$PdCl$_4$ solutions. The Pd content was found to increase with higher concentration of pre-reduced Pd and then remained constant with an average Pd (and/or Pt) content determined to be 0.0288±0.008 mg per strip. The reproducibility of the Pd nanoparticle loading may imply a natural limit to the hydroxylated surface of jute stem. The Pd loading onto jute stem observed in the samples may be attributable to the combination of strong van der Waals forces and hydrophobic interaction between metal nanoparticles and the jute-stick surface, leading to the nanoparticle immobilization.

Olefin Hydrogenation

Catalytic hydrogenation of olefin substrate samples was performed in a 20 mL screw-capped vial under ambient conditions. To the suspension of tetrahydroxydiboron (THDB, 3.1 mmol) in 5 mL water, the substrate (1 mmol) was added and stirred. The vial was capped and introduced into a pre-heated (70° C.) oil bath. After thermal equilibrium was reached, the Pd-GS strip was added to the vial, which was stirred magnetically. The progress of the reactions was monitored by thin layer chromatography (TLC) and gas chromatography (GC) by periodically withdrawing small aliquots from the vials. The product was extracted in each case using dichloromethane, dried with magnesium sulfate (anh.), and passed through short silica gel column. The conversion and selectivity were determined by GC and identified and quantified by gas chromatography-mass spectrometry (GC-MS).

Quinoline Hydrogenations

The transfer hydrogenation of quinoline was conducted in a 10 mL glass reaction tube reactor fitted with magnetic stirrer and a Teflon screw cap. Tetrahydroxydiboron (THDB, 4.1 mmol), quinoline (1 mmol) and deionized water (5 mL) were added to the 10 mL glass reaction tube and stirred at 550 rpm. A strip of Pd-GS catalyst was inserted and stirred at 60° C. at the same speed. The progress of the reaction was monitored by TLC and gas chromatography as in olefin hydrogenation. After cooling, the reaction mixture was extracted using dichloromethane, dried with magnesium sulfate, and the solvent removed under vacuum. The residue was re-dissolved in minimum amount of dichloromethane and passed through a short silica gel column using a mixture of hexane and ethyl acetate (8:2) as the eluent. Gas chromatography was used to measure the conversion and selectivity and the products were identified by mass spectrometry on the GC-MS.

Referring now to the drawings, wherein like reference numerals designate identical or corresponding parts throughout the several views.

FIG. 1 shows a pictorial presentation of the palladium (or platinum) on the green support, i.e., jute stems (Pd@GS or Pd-GS) as a "dip catalyst." The image has representative structures of cellulosic material with dots of metallic catalysts upon it, and lignin is not shown for reasons of simplicity. Exemplary substrates are shown on the sides of the central frame, illustrating some of the versatility of the inventive catalysts. The handle at the top of the frame represents the ease of removal and/or recovery of the (reusable) catalysts after use.

FIG. 2 shows a schematic illustration shows a Pd nanoparticles with average longest dimensions (often diameters) in the range of 15 to 20 nm prepared on jute stem. The oven dried jute-stem slices of the dimensions of ~2 cm×0.5 cm×0.1 cm were immersed in $K_2PdCl_4$ solution in deionized water (32 mg/20 mL) and soaked for 2 hours to provide a suspension. The vial containing the suspension was heated at 70° C. for 1 hour, then 100 µL formic acid was added to reduce the Pd precursors while the mixture was stirred for 15 minutes, changing the color of the vial contents to black. Heating of the vial was continued for another hour to complete the reduction and lodging of the nanoparticles onto the substrate. The contents were allowed to settle down, providing thin jute slices completely covered with black Pd nanoparticles. The Pd-coated jute stem slices were dried in open air for 24 hours, providing the samples used for characterization.

Figure 3A:
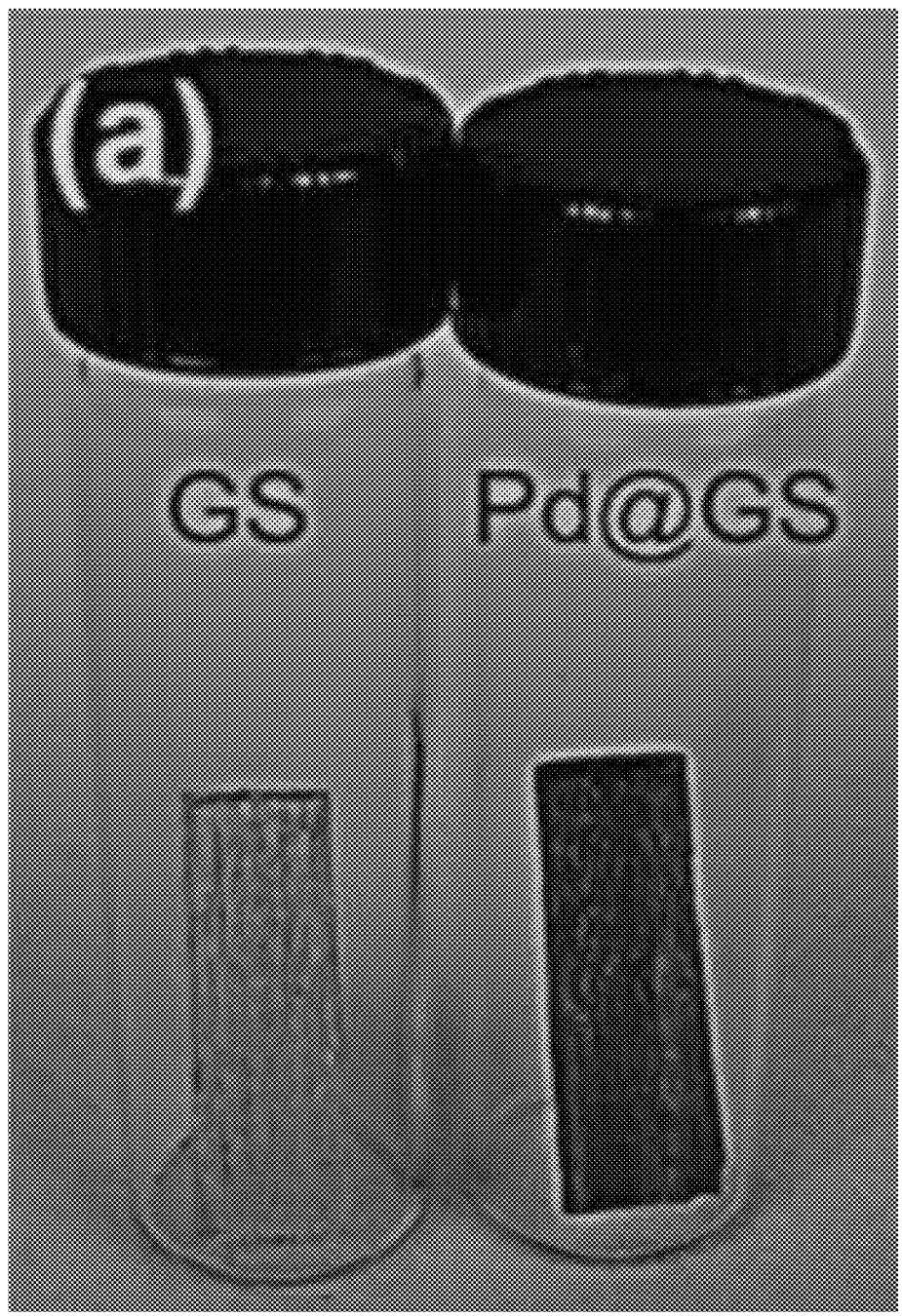
FIG. 3A shows a photograph of an exemplary pure "green support" (GS) jute stem (left) and an exemplary Pd-GS catalyst, i.e., GS-supported palladium catalyst (right)
Figure 3B:
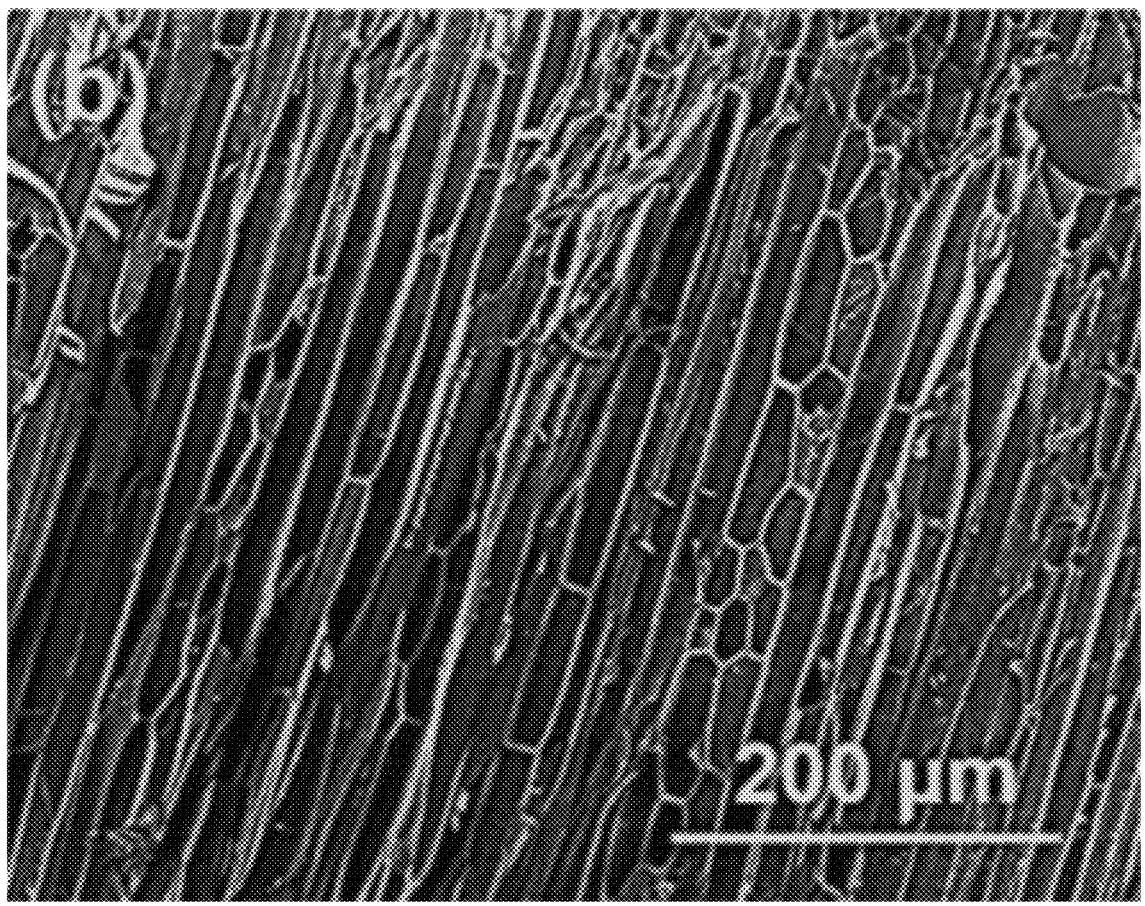
FIG. 3B shows a scanning electron microscope (SEM) image of an exemplary pure green support (GS), i.e., without metals on 200 μm scale.
Figure 3C:
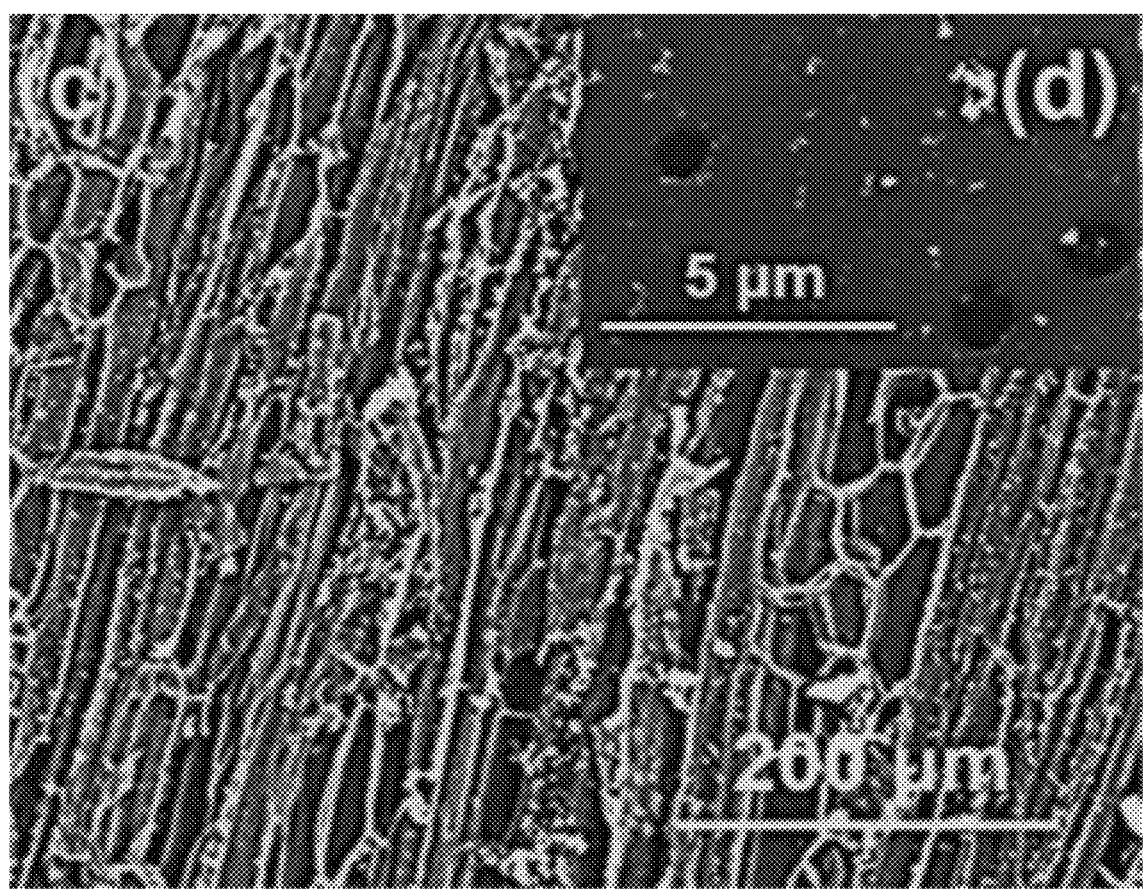
FIG. 3C shows an SEM image of an exemplary Pd-GS catalyst and an inset (upper right) showing a magnified SEM view indicating uniform distribution of Pd nanoparticles.

FIG. 3A shows a photograph of the jute stem slice on the left and the black, Pd-coated jute stem slice as pulled out of the treatment vial. FIG. 3B shows a scanning electron microscope (SEM) image revealing morphological and nanostructural features of pure jute stem samples. FIG. 3B shows a scanning electron microscope (SEM) image revealing morphological and nanostructural features of Pd-GS. Pure jute strips are highly fibrous—a characteristic that is maintained after the decoration of the jute strips with Pd nanoparticles, e.g., via in-situ reduction in the acidic media. The SEM image in FIG. 3C and the embedded portion in the upper right portion of FIG. 3C, labelled "(d)," indication the formation of spherical Pd nanoparticles with uniform distribution upon the jute strips.

Figure 4A:
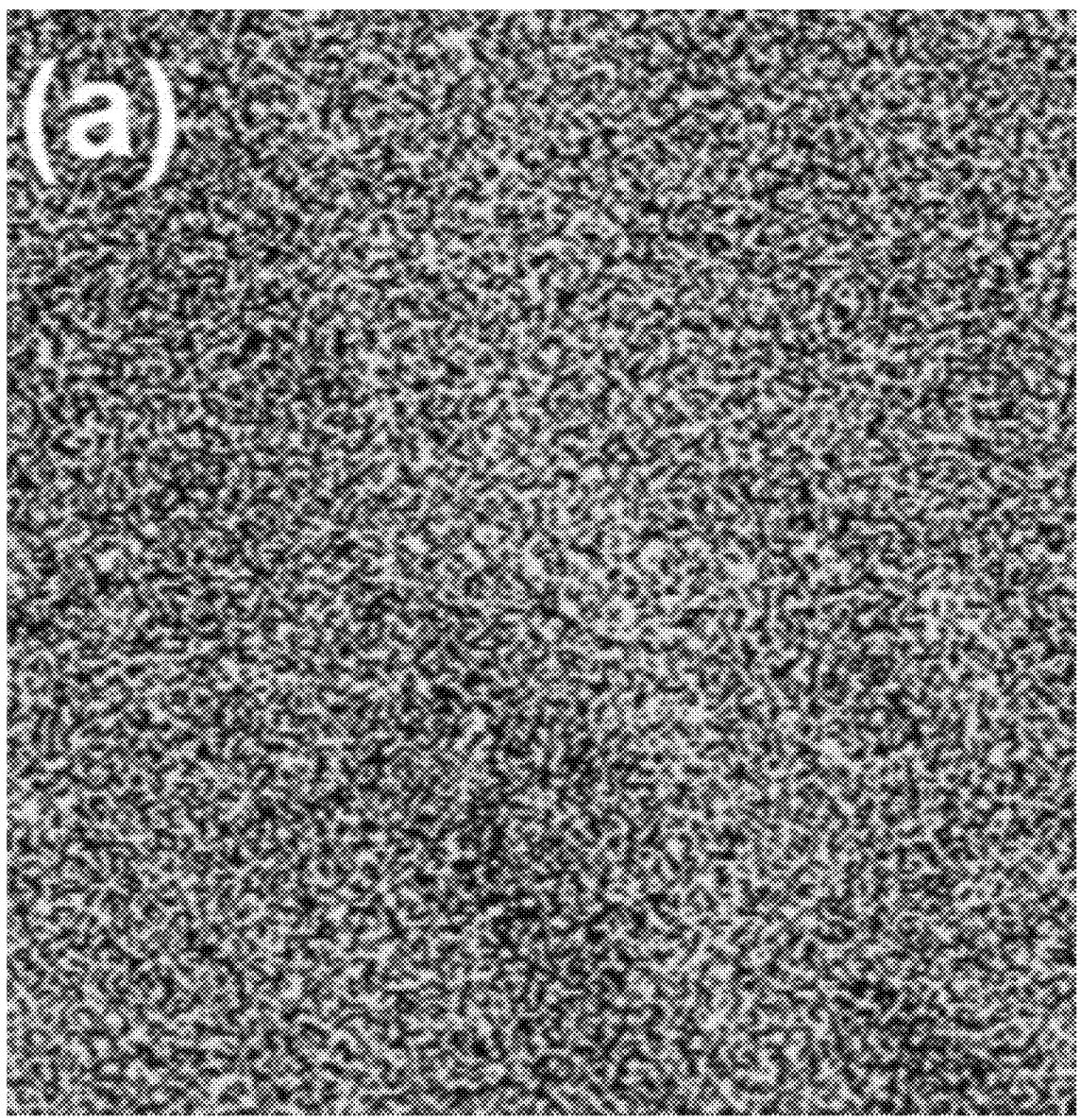
FIG. 4A shows an elemental mapping of carbon (C) in an exemplary inventive Pd-GS catalyst.
Figure 4B:
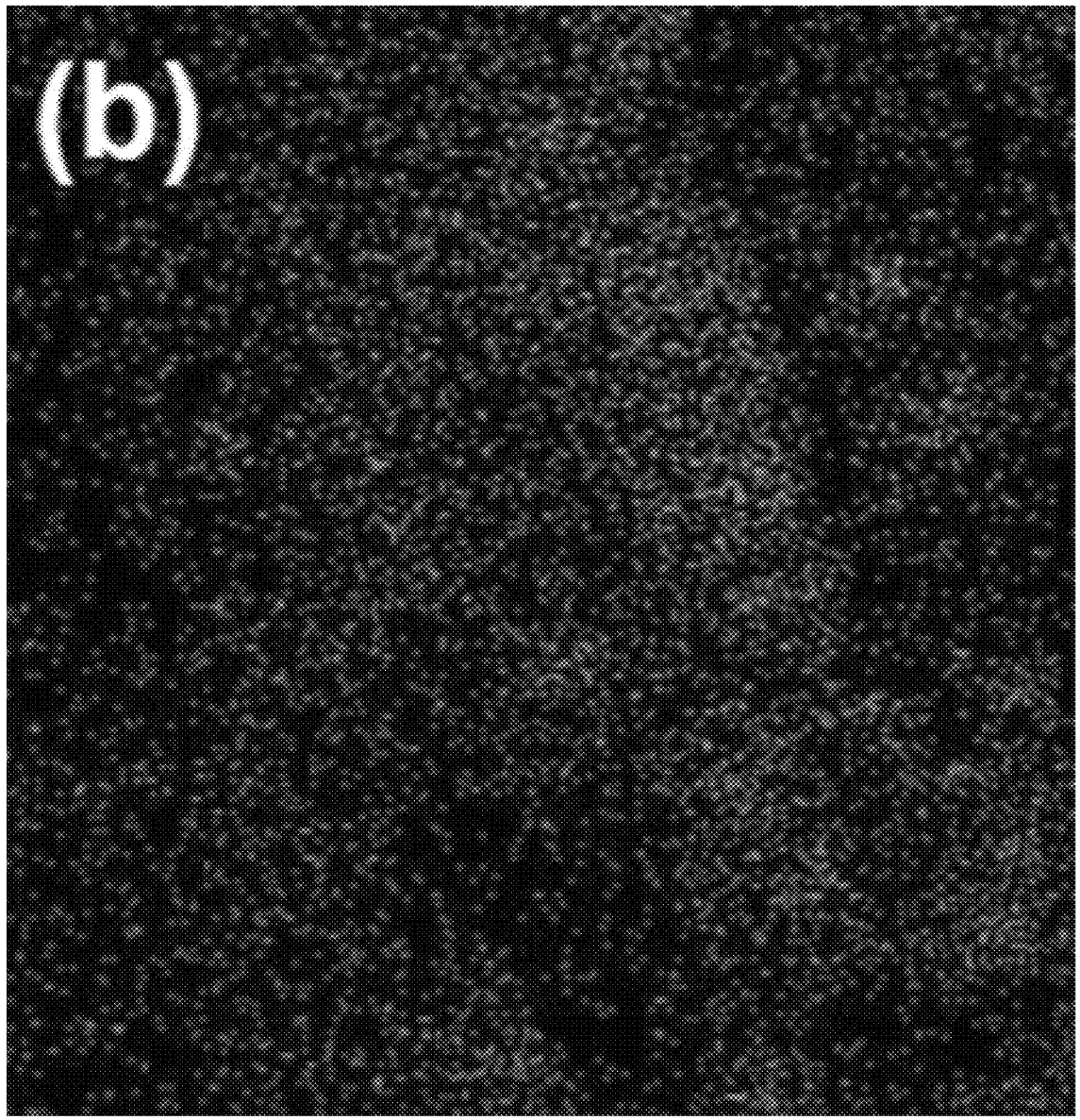
FIG. 4B shows an elemental mapping of palladium (Pd) in an exemplary inventive Pd-GS catalyst.
Figure 4C:
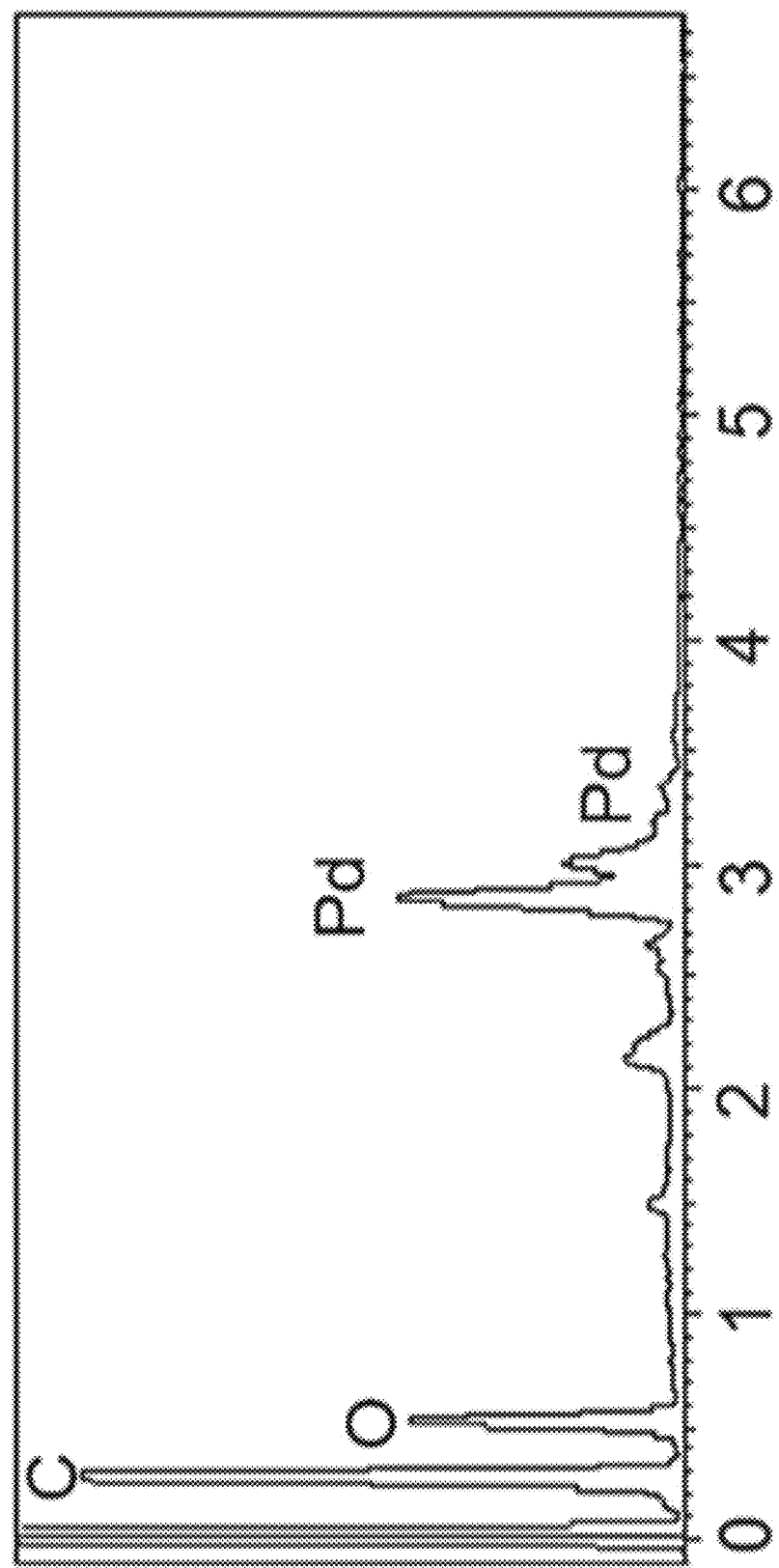
FIG. 4C shows an energy-dispersive X-ray spectroscopy (EDS, EDX, EDXS, or XEDS) signature of an exemplary inventive Pd-GS catalyst.

FIGS. 4A and 4B, showing confined area elemental mapping, and FIG. 4C, showing energy-dispersive x-ray spectroscopy (EDS) quantification, further indicate the uniform distribution of Pd upon the jute stems.

Figure 5A:
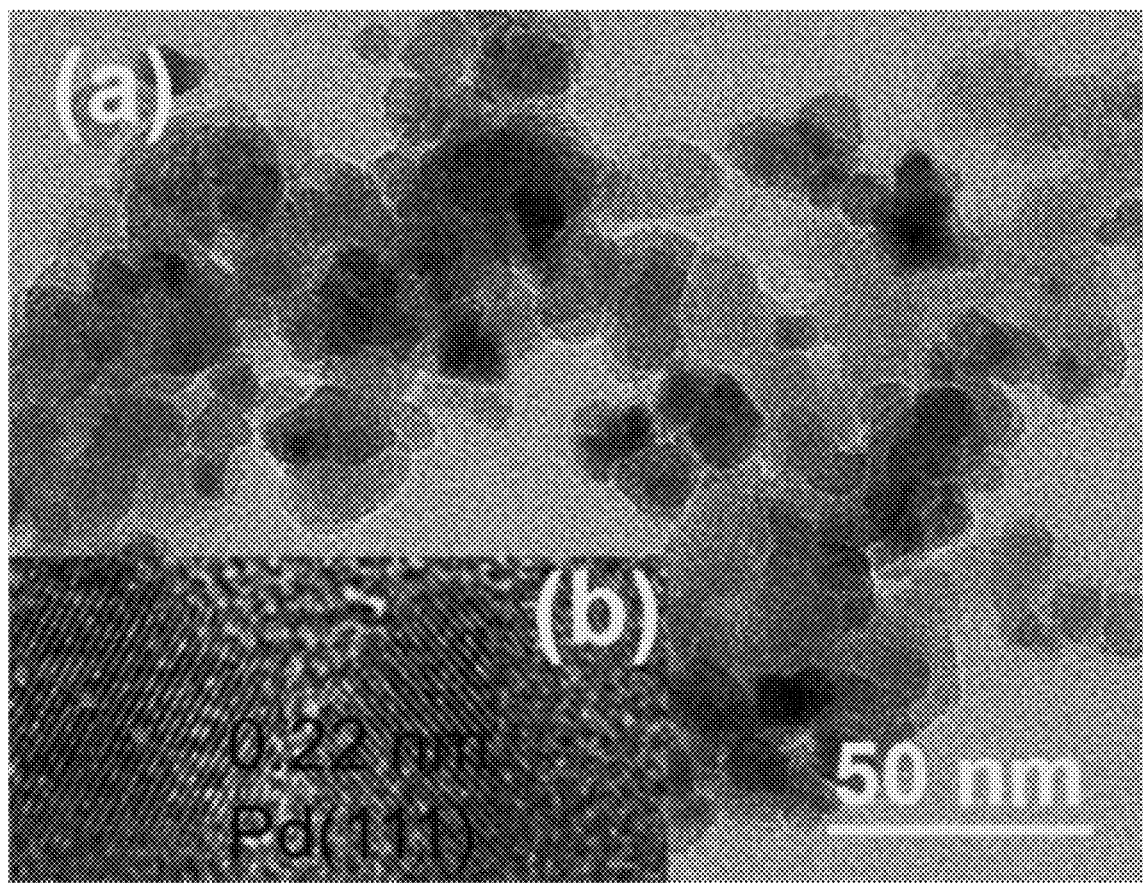
FIG. 5A shows a transmission electron microscope (TEM) image of Pd nanoparticles anchored on the surface of the green support (GS) in an exemplary Pd-GS sample, as well as a inset on the lower left showing a high resolution transmission electron microscope (HRTEM) image of the palladium distribution on the GS.
Figure 5B:
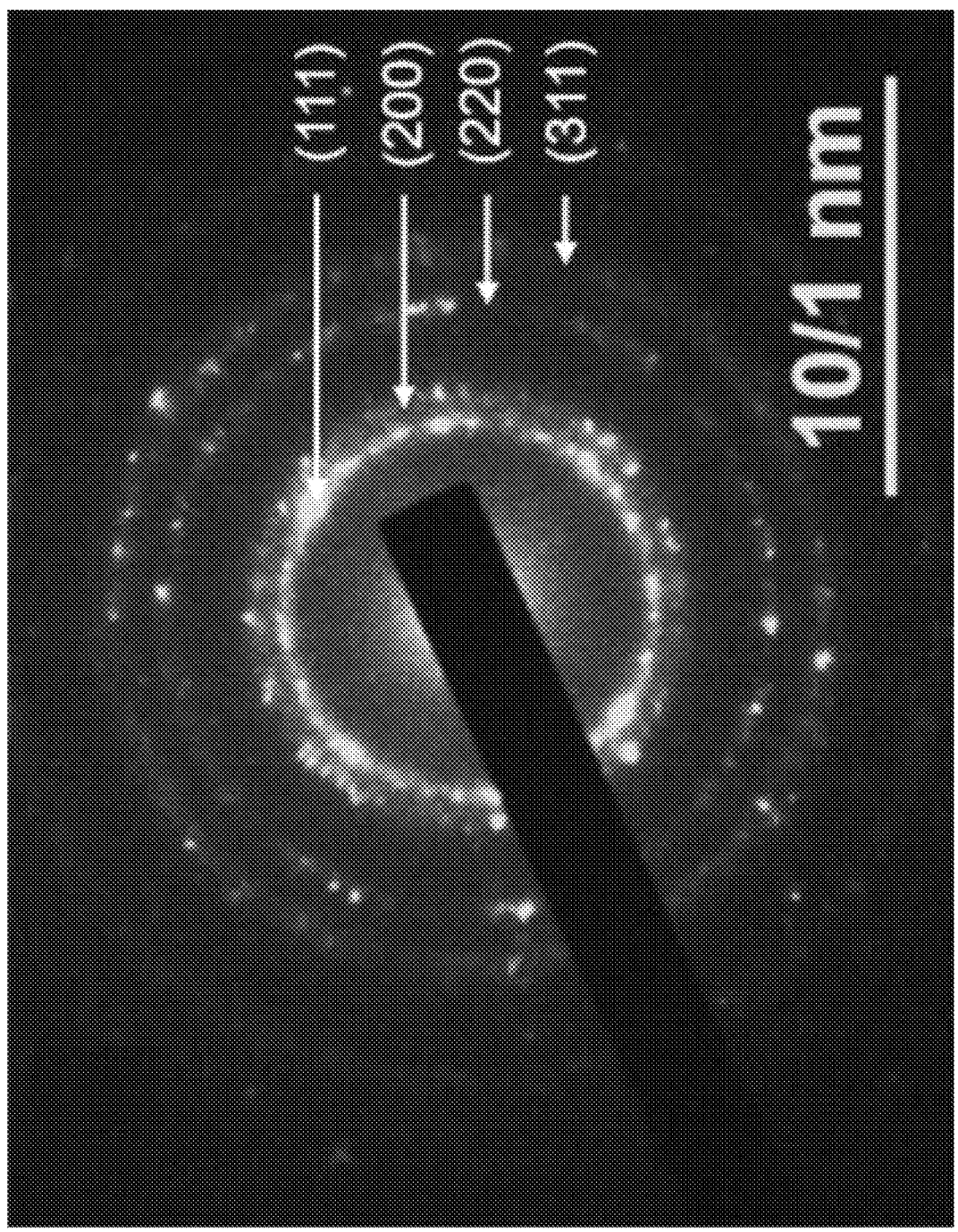
FIG. 5B shows a selected-area electron diffraction (SAED) image of an exemplary inventive Pd-GS catalyst.

FIG. 5A, including a higher magnification embedded lower right portion, labelled "(b)," shows transmission electron microscopy (TEM) images indicating uniform distribution of Pd with average diameter in a range of from 15 to 20 nm. The results in FIG. 5A are further confirmed by the dynamic light scattering technique, measuring the particle sizes, in the selected area electron diffraction (SAED) image shown in FIG. 5B. The calculated d-value from the SAED image could be assigned to the <111> plane reflection of the face-centered cubic (fcc) structured Pd nanoparticles.

Figure 6A:
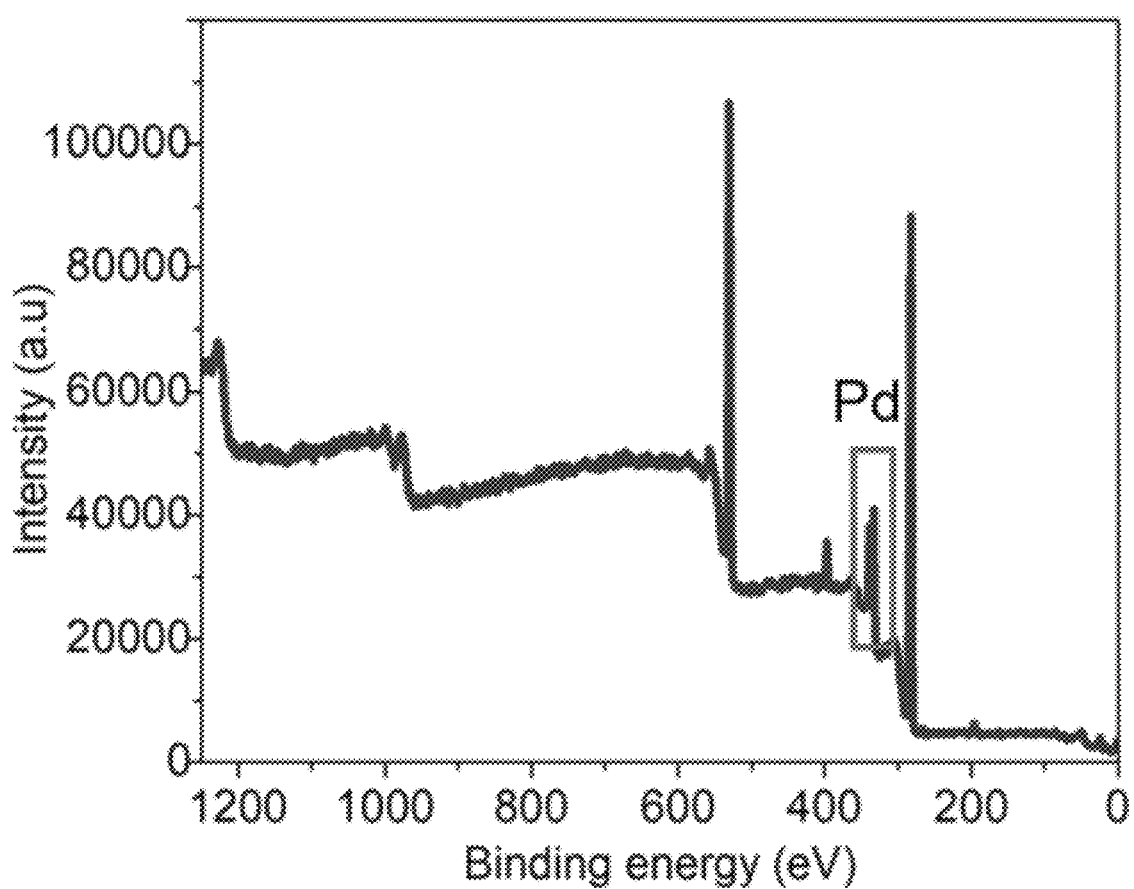
FIG. 6A shows an x-ray photoelectron spectroscopy (XPS) survey plot of an exemplary inventive Pd-GS catalyst.
Figure 6B:
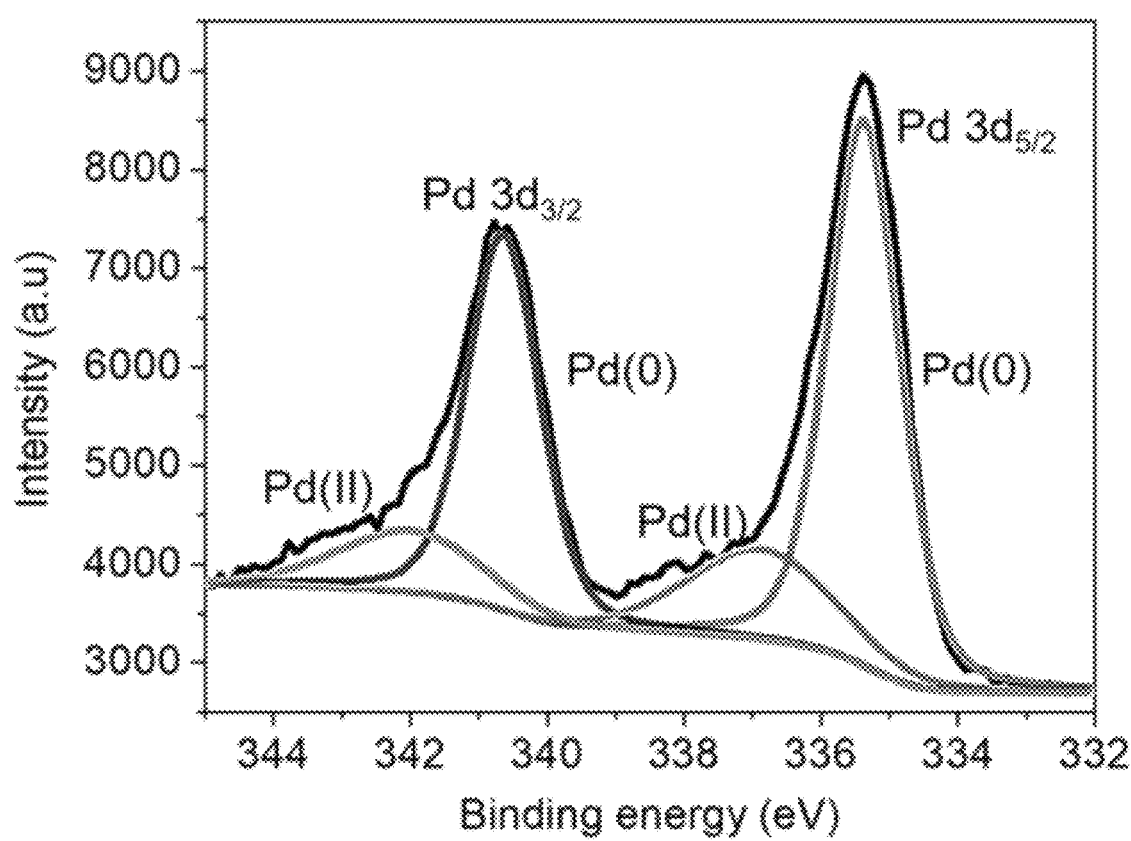
FIG. 6B shows an x-ray photoelectron spectroscopy (XPS) plot of signatures of oxidation states of an exemplary inventive Pd-GS catalyst with Pd decorating the support surface.

FIG. 6A shows x-ray photoelectron spectroscopic (XPS) analytical results on the exemplary Pd-GS material synthesized as described in the Example. The XPS results can be used to identify the electronic states of Pd. The overall composition of the sample is depicted in the global XPS survey in FIG. 6A, which indicates the presence of C, O, and Pd. The formation of $Pd^0$ (elemental) on the surface of jute stem is confirmed by the deconvolution in the Pd doublet peaks, as seen in FIG. 6B, with binding energies of 335.3 eV ($3d_{5/2}$) and 340.5 eV ($3d_{3/2}$), known to be associated with $Pd^0$. FIG. 6B also shows peaks at 337.2 eV and 342.4 eV, which are associated with $Pd^{2+}$, likely due to the formation of palladium (II) oxide, PdO, from the partial oxidation of Pd nanoparticles in ambient conditions.

Figure 7A:
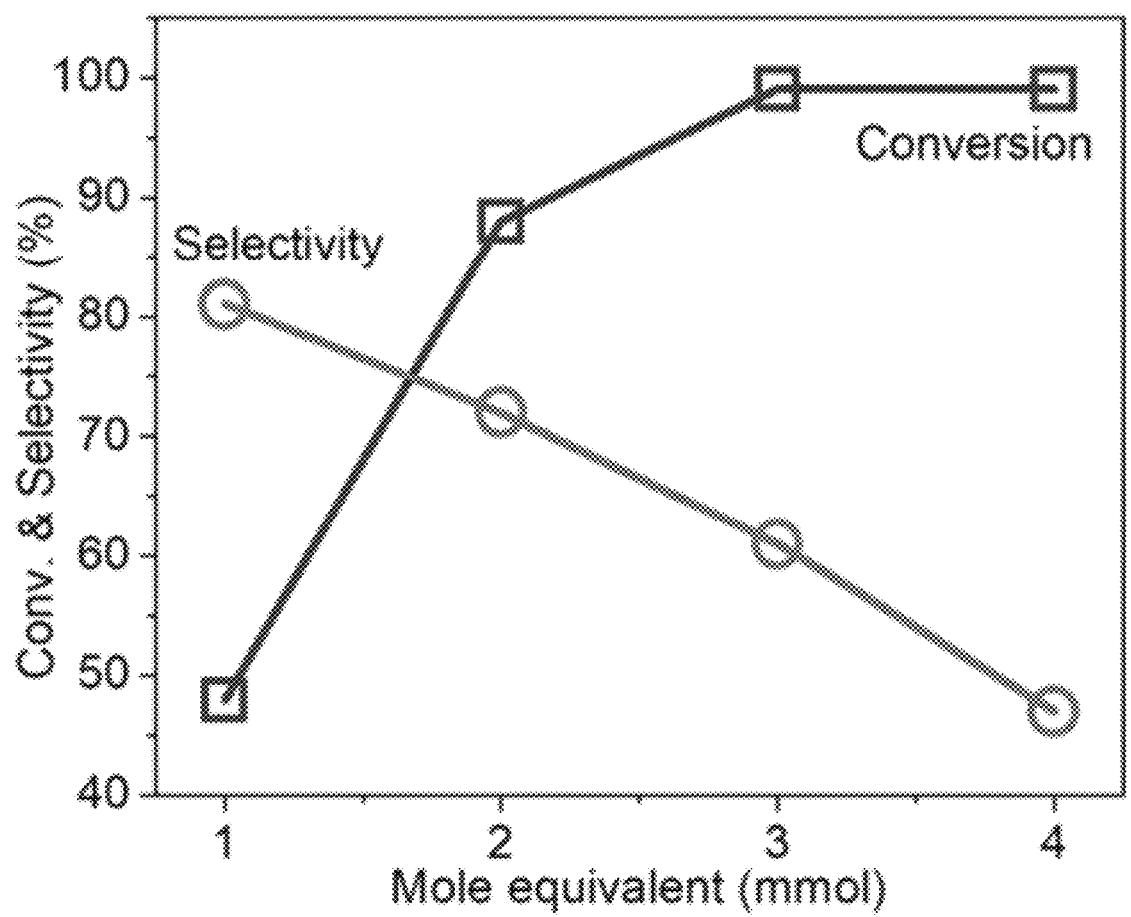
FIG. 7A shows, on a common y-axis, plots of the variation in the conversion and selectivity of m-nitrostyrene at 45° C. with THDB molar equivalents in tetrahydrofuran (THF)

FIG. 7A shows a plot of the data from experiments exploring the effect of temperature and mole equivalent of tetrahydroxydiboron (THDB) on the selectivity and conversion in the reduction of m-nitrostyrene in tetrahydrofuran (THF). On increasing the molar equivalents of tetrahydroxydiboron (THDB) from 1.1 to 4.1, the conversion increased from 48% to >99%. However, at the same time, while increasing the molar equivalents of THDB from 1.1 to 4.1, the selectivity in reducing m-nitrostyrene is reduced from ~81% to ~47% for the 4.1 mole equivalent of THDB. These results indicate that reaction parameters can be subtly modified to reduce the alkenyl group in styrene in the presence of an easily reducible nitro functional group with selectivity.

Figure 7B:
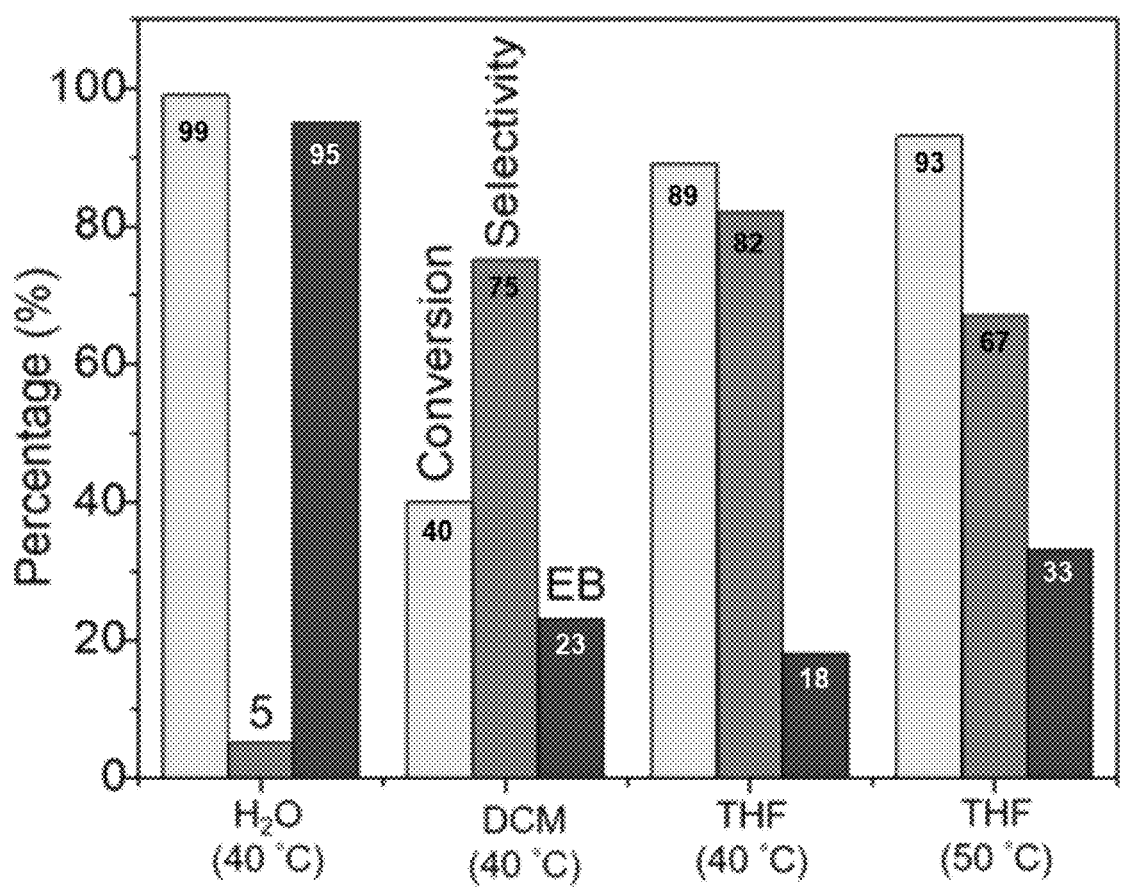
FIG. 7B shows a chart of the variation in the conversion and selectivity of o-bromostyrene with 1.1 equivalent of tetrahydroxydiboron (THDB) in different solvents, wherein EB means ethylbenzene.

FIG. 7B shows an example of the reduction of o-bromostyrene to form the corresponding hydrogenated product, o-bromoethylbenzene, at 40° C. In most cases, hydrogenation of bromostyrene occurs via hydrogenolysis, where dehalogenation is avoided, through polymerization, or through both hydrogenolysis and polymerization taking place simultaneously. Exemplary Pd-GS catalysts prepared as described herein demonstrated excellent reactivity and selectivity without hydrogenolysis or polymerization. Using water as solvent, at 40° C., the reduction of bromostyrene with Pd-GS yielded only ethylbenzene with complete debromination within 24 hours. However, when the reaction was performed at 40° C. in dichloromethane with 1.1 equivalent of tetrahydroxydiboron (THDB), the conversion achieved was about 40 mol. % in 48 hours with 75% selectivity towards the formation of o-bromoethylbenzene, with 22 mol. % ethylbenzene with 3 mol. % of styrene also forming as side products. By changing the solvent to THF, the conversion was improved to 89% and the highest selectivity (82%) towards o-bromoethylbenzene was achieved. This level of selectivity is unexpectedly superior to results from known reduction systems under such mild reaction conditions. On increasing the temperature at 50° C., the conversion was improved to 93% with the sacrifice of selectivity to 67% o-bromoethylbenzene and 33% de-brominated product.

Recyclability Studies

Aspects of the invention include catalysts, including "dip-catalysts," which are easily deployed into reaction systems and/or removed post-reaction. The reusability of spent catalyst in subsequent cycles for transfer hydrogenation, e.g., of quinoline, is possible with inventive catalysts. To investigate its robustness and sustainability, exemplary inventive catalysts were extracted from the reaction mixture, thoroughly washed with water and dichloromethane, and dried for use in next cycle with fresh batch of substrate, here quinoline, with tetrahydroxydiboron (THDB) as the reducing agent in aqueous medium.

Figure 8A:
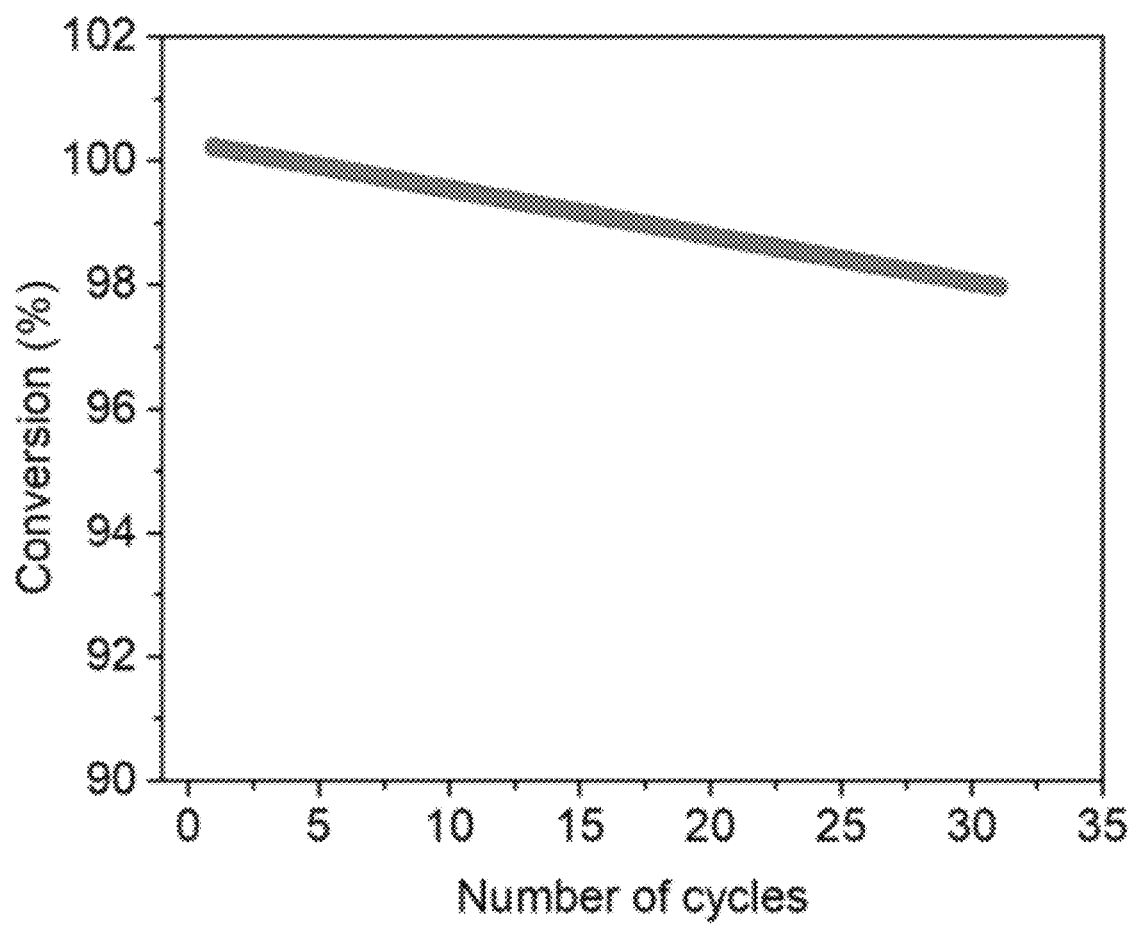
FIG. 8A shows a plot indicating the reusability potential of an exemplary inventive Pd-GS catalyst for quinoline hydrogenation in water using tetrahydroxydiboron (THDB) as a reducing agent.
Figure 8B:
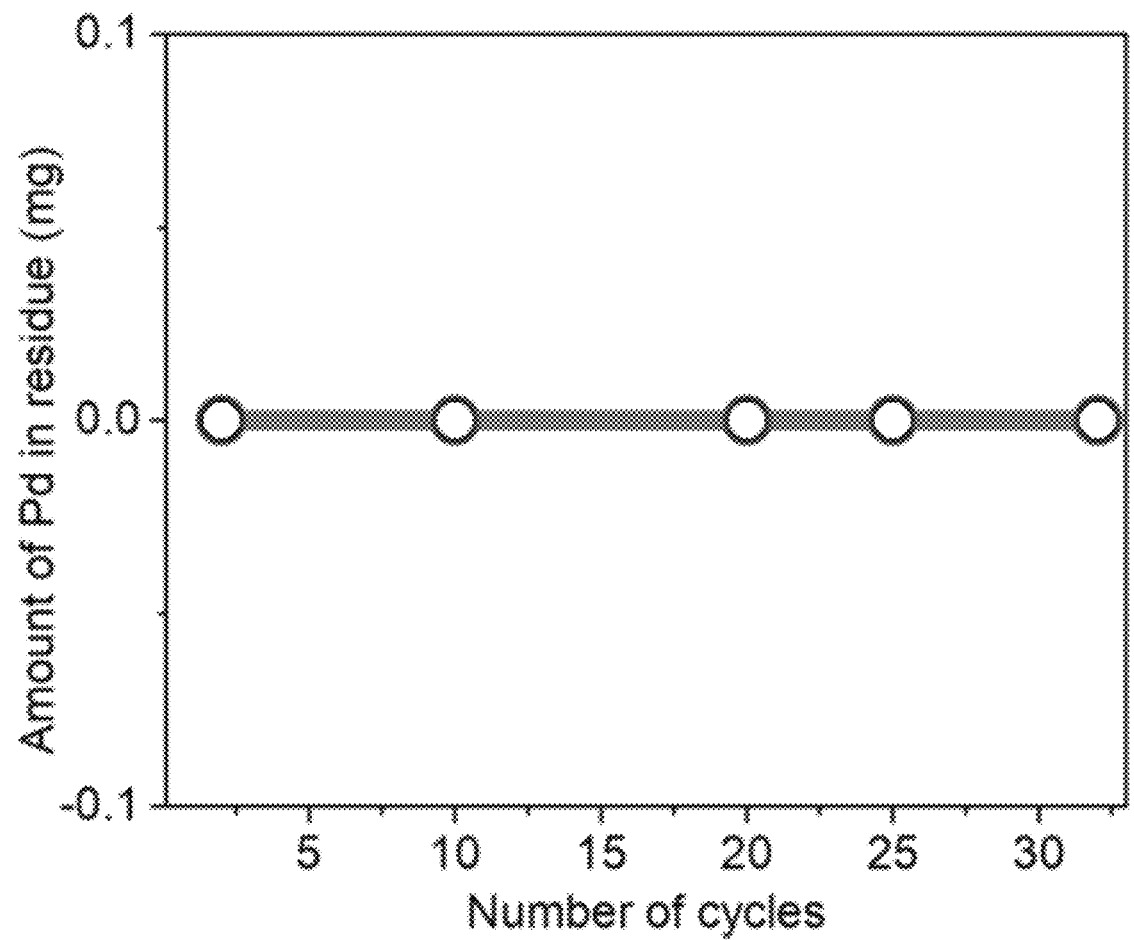
FIG. 8B shows a plot of data from inductively coupled plasma optical emission spectrometry (ICP-OES) evidencing no leaching of Pd from an exemplary inventive Pd-GS dip-catalyst after 32 cycles.

As seen in FIG. 8A, this procedure was repeated multiple times and catalyst was used in 32 consecutive cycles maintaining catalytic propensity without appreciable degradation of catalytic activity. Inventive catalysts may reproduce at least 75, 80, 85, 90, 91, 92, 92.5, 93, 94, 95, 96, 97, 97.5, 98, 99, 99.1, 99.5, or 99.9% of the original activity (e.g., TOF, catalytic metal content, and/or selectivity) after 25, 28, 30, 32, 35, 40, 45, 50, 55, 60, 75, 85, or even 100 cycles. The results in FIG. 8A were corroborated by ICP-OES experiments, extracting samples at certain intervals and analyzed to determine if any Pd was leached out. As seen in FIG. 8B, no trace of Pd was detected in the solution throughout the cycling. The surface morphology and stability of the recycled catalyst showed no severe damage to the jute-stick surface or no agglomeration of the Pd nanoparticles. XPS analysis revealed peaks at 335.4 eV and 340.6 eV, reflecting the preservation of Pd in the elemental (0) oxidation state. A small shoulder at 336.4 eV, corresponding to PdO, may be ascribed to prolonged exposure to aerobic conditions.

Figure 9:
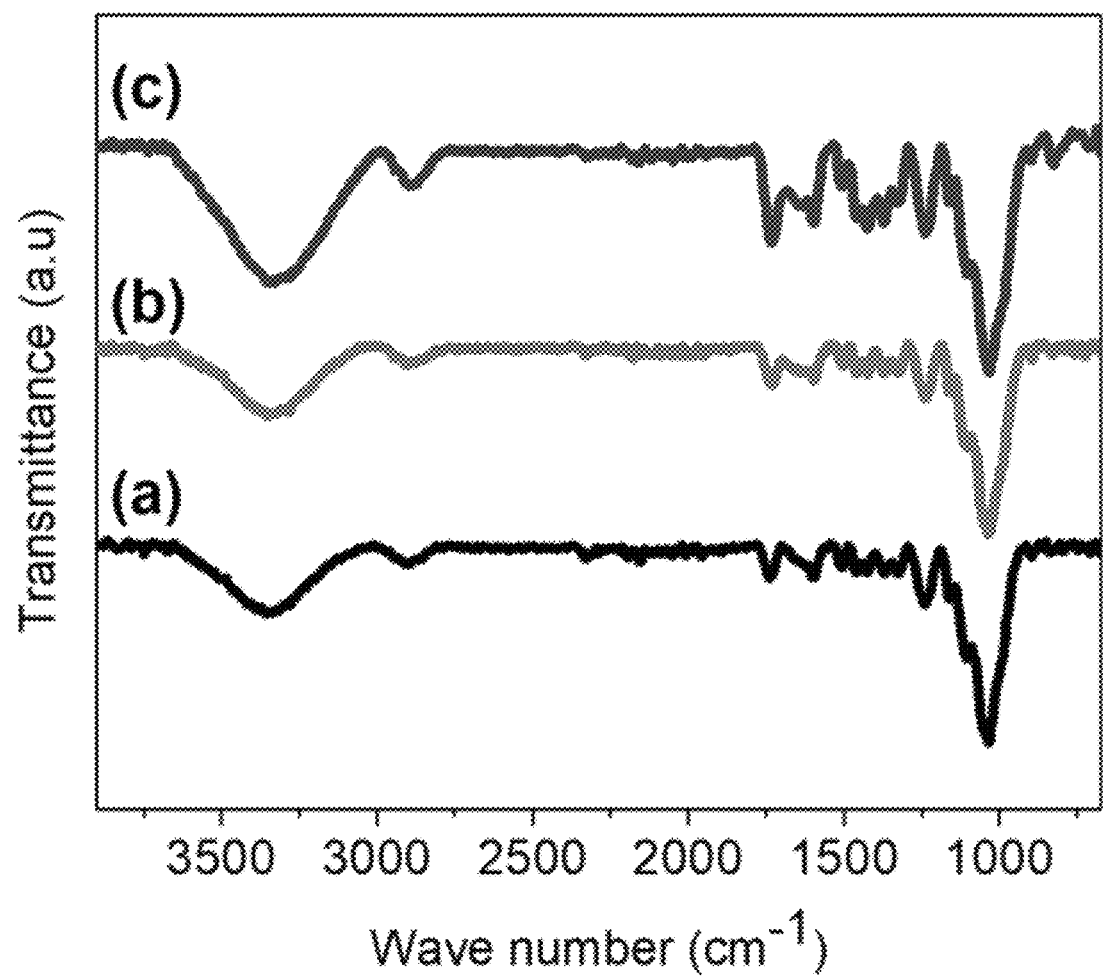
FIG. 9 shows Fourier-transform infrared (FT-IR) spectra of an exemplary pure "green support" (GS) jute stem in the bottom spectrum (a), an exemplary inventive Pd-GS catalyst in the middle spectrum (b), and reused exemplary inventive Pd-GS catalyst after 32 cycles (c)

FIG. 9 shows Fourier-transform infrared (FT-IR) spectra of (a) pure (jute stem) "green" support (i.e., GS) in (a), Pd on jute stem supports ("Pd@GS" or "Pd-GS") in (b), and reused Pd@GS after 32 cycles in (c), which may be used to evaluate the decoration of palladium onto the jute stem. Hydroxyl group stretching on the pure jute stem, seen in (a) of FIG. 9, was detected by a characteristic peak at around 3345 cm$^{-1}$, and there was no significant change in the signature after Pd decoration.

Figure 10A:
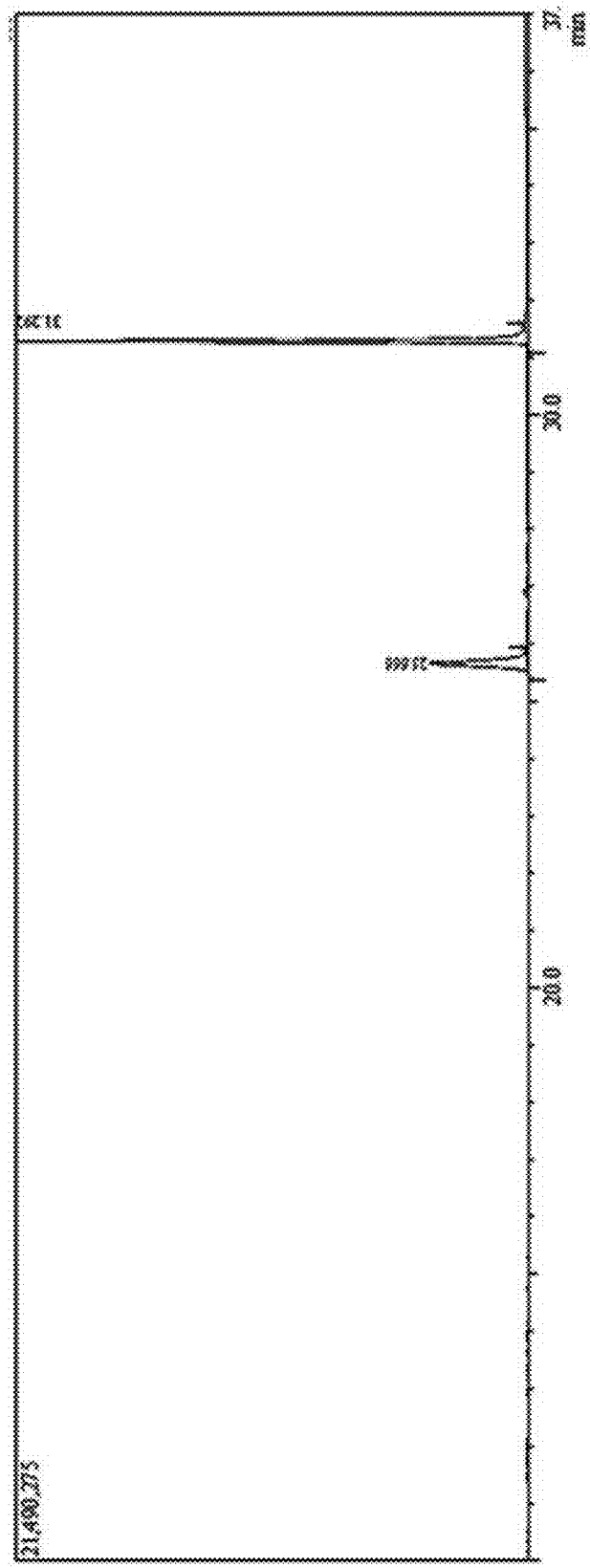
FIG. 10A shows a gas chromatograph of a catalytic hydrogenation of trans-methylstilbene using an exemplary inventive Pd-GS catalyst.
Figure 10B:
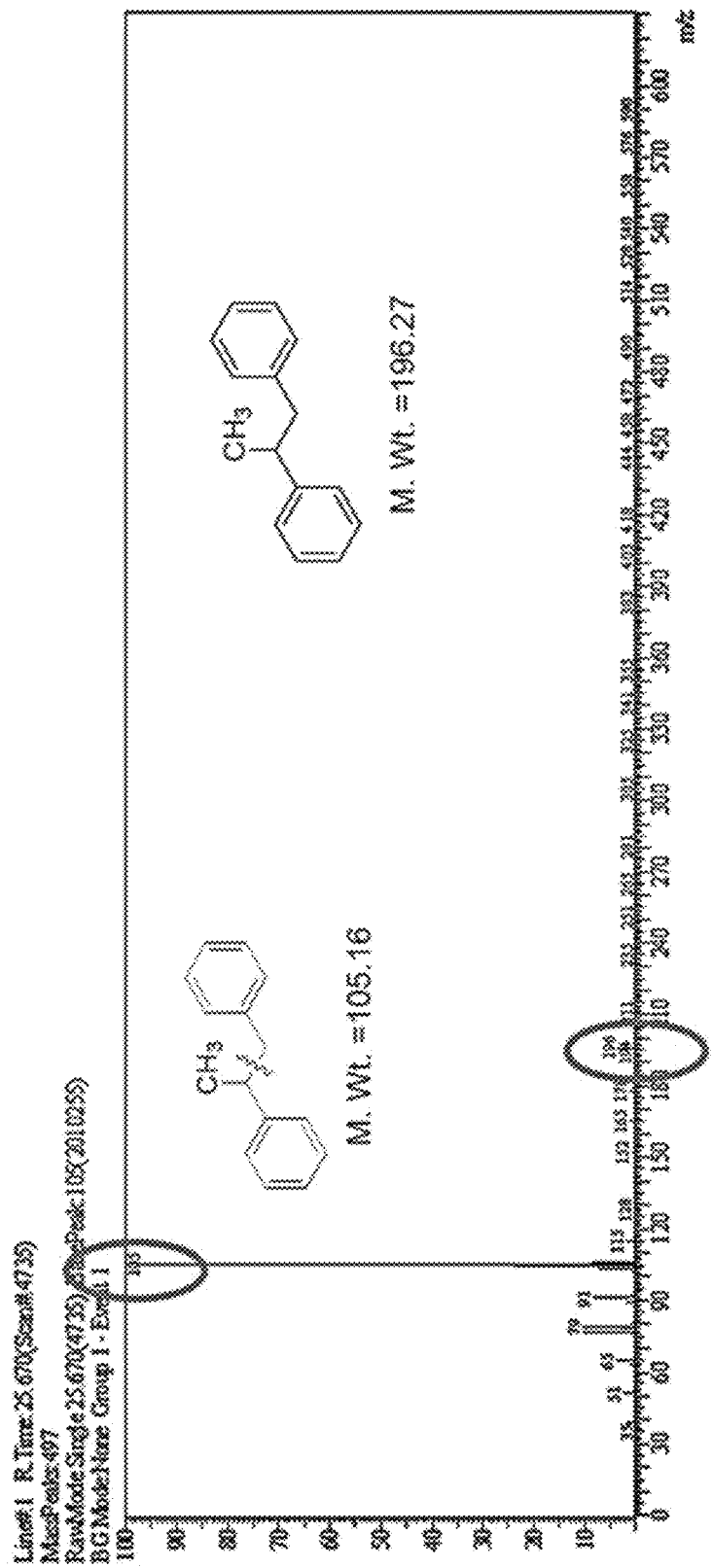
FIG. 10B shows a mass spectrum of the gas chromatography (GC) peak at an $R_t$ of 25.670 minutes of the catalytic hydrogenations of trans-methyl stilbene showing hydrogenated product.
Figure 10C:
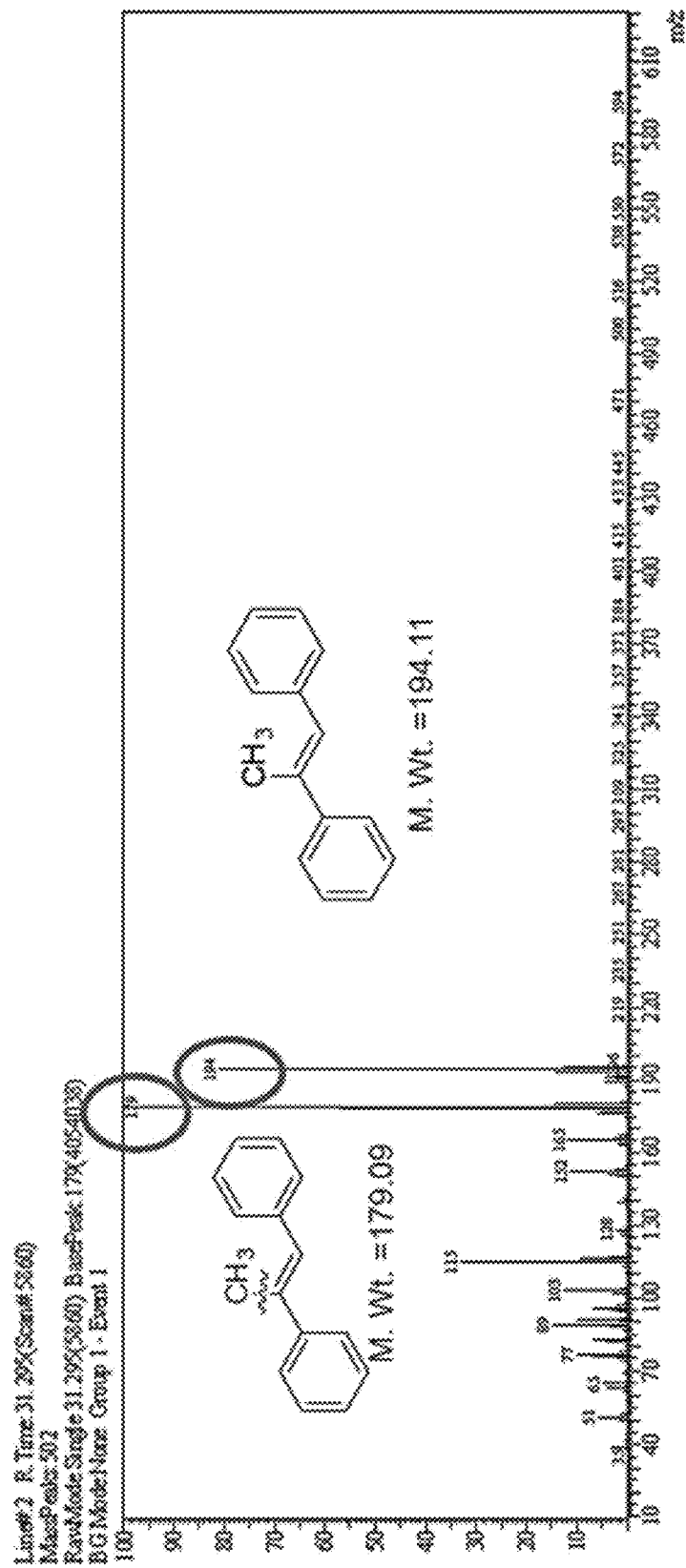
FIG. 10C shows a mass spectrum of the GC peak at an $R_t$ of 31.295 minutes of the catalytic hydrogenations of trans-methylstilbene showing starting material.

FIG. 10A to 10C show a gas chromatography (GC) spectrum of the results of a Pd-GS catalytic hydrogenation experiment of trans-methylstilbene using an exemplary Pd-GS catalyst (FIG. 10A) and mass spectra of the GC peak at an $R_t$ of 25.670 minutes (FIG. 10B), showing the hydrogenated product and a fragment, split across the former olefin, and of the GC peak at an $R_t$ of 31.295 minutes (FIG. 10C), showing the starting material.

Figure 11A:
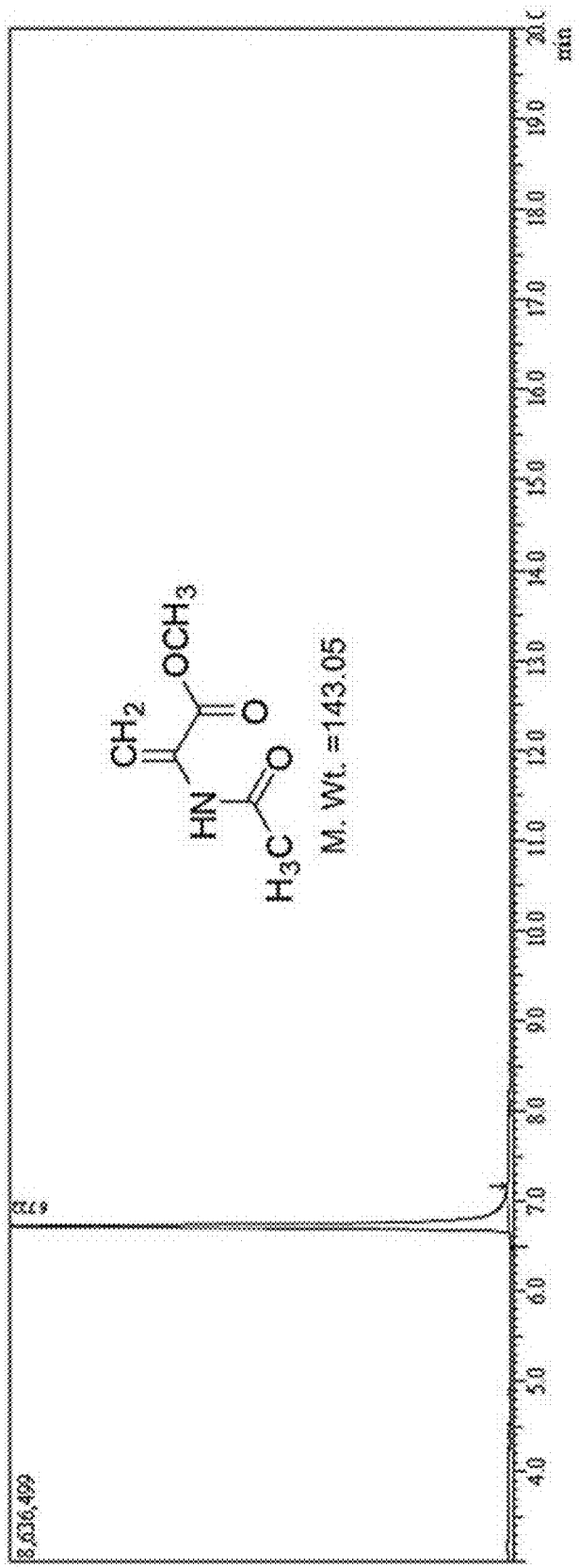
FIG. 11A shows a gas chromatograph of the starting material in a catalytic hydrogenation of methyl-acetamidoacrylate using an exemplary inventive Pd-GS catalyst.
Figure 11B:
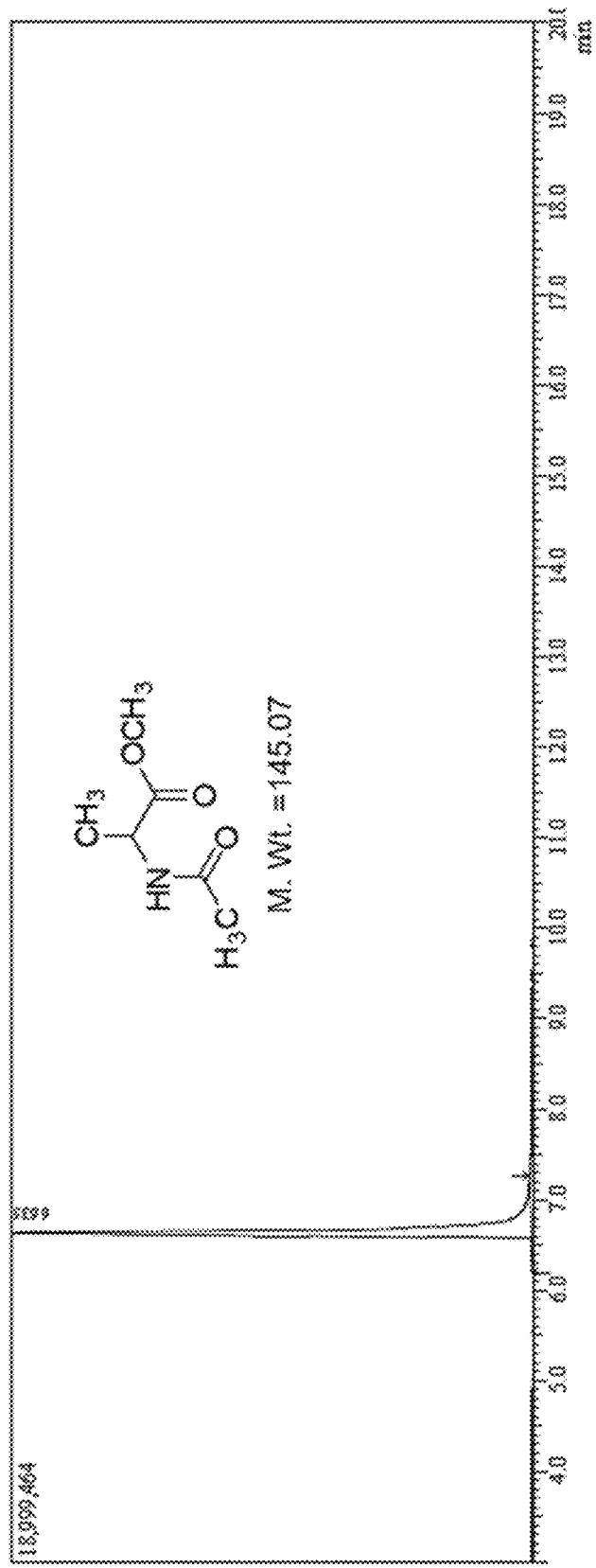
FIG. 11B shows a gas chromatograph of the hydrogenated material in a catalytic hydrogenation of methyl-acetamidoacrylate using an exemplary inventive Pd-GS catalyst.
Figure 11C:
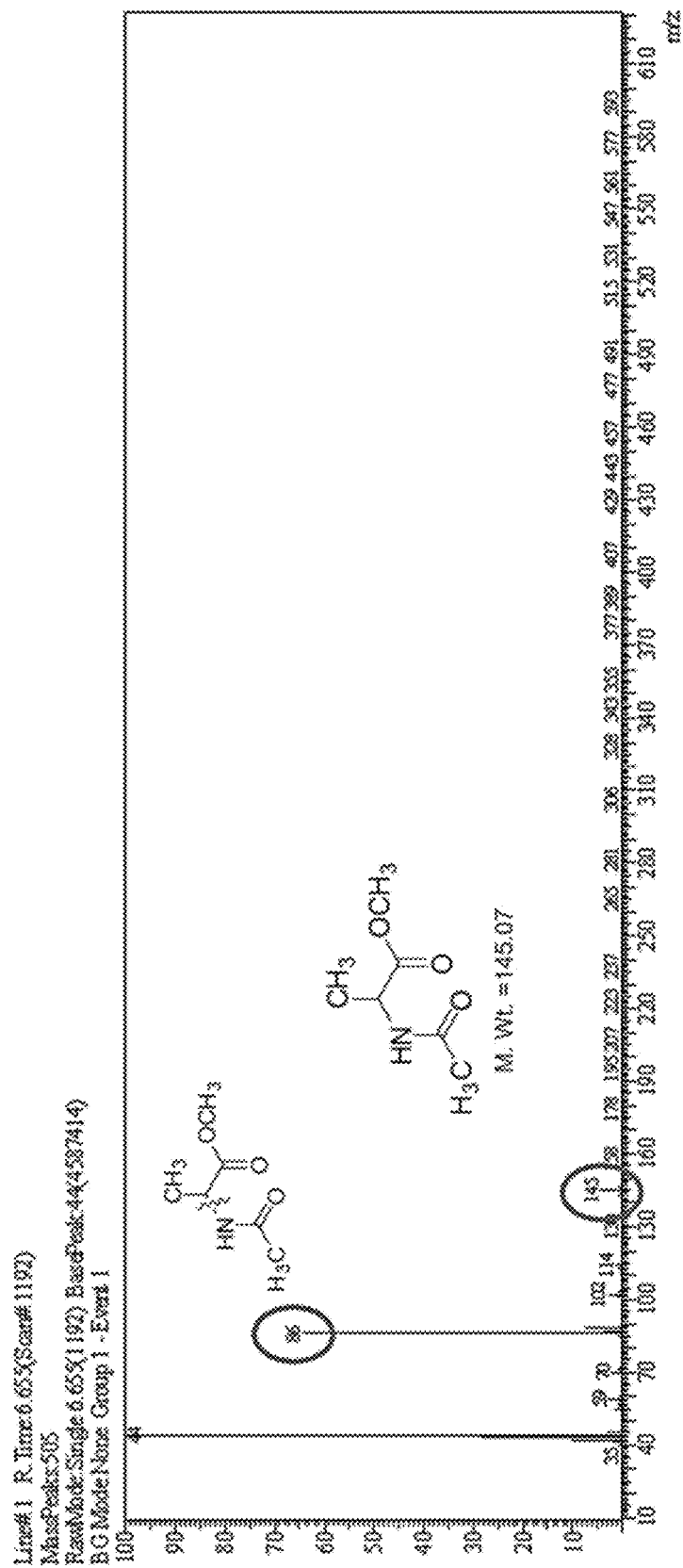
FIG. 11C shows a mass spectrum of the hydrogenated material in a catalytic hydrogenation of methyl-acetamidoacrylate using an exemplary inventive Pd-GS catalyst.

FIG. 11A to 11C show gas chromatography (GC) spectra of the results of a Pd-GS catalytic hydrogenation experiment of methyl 2-acetamidoacrylate (MW: 143.14 g/mol, CAS Number: 35356-70-8), showing the starting material (FIG. 11A) and the reduced product (FIG. 11B), and a mass spectrum of hydrogenated product (FIG. 11C).

Figure 12A:
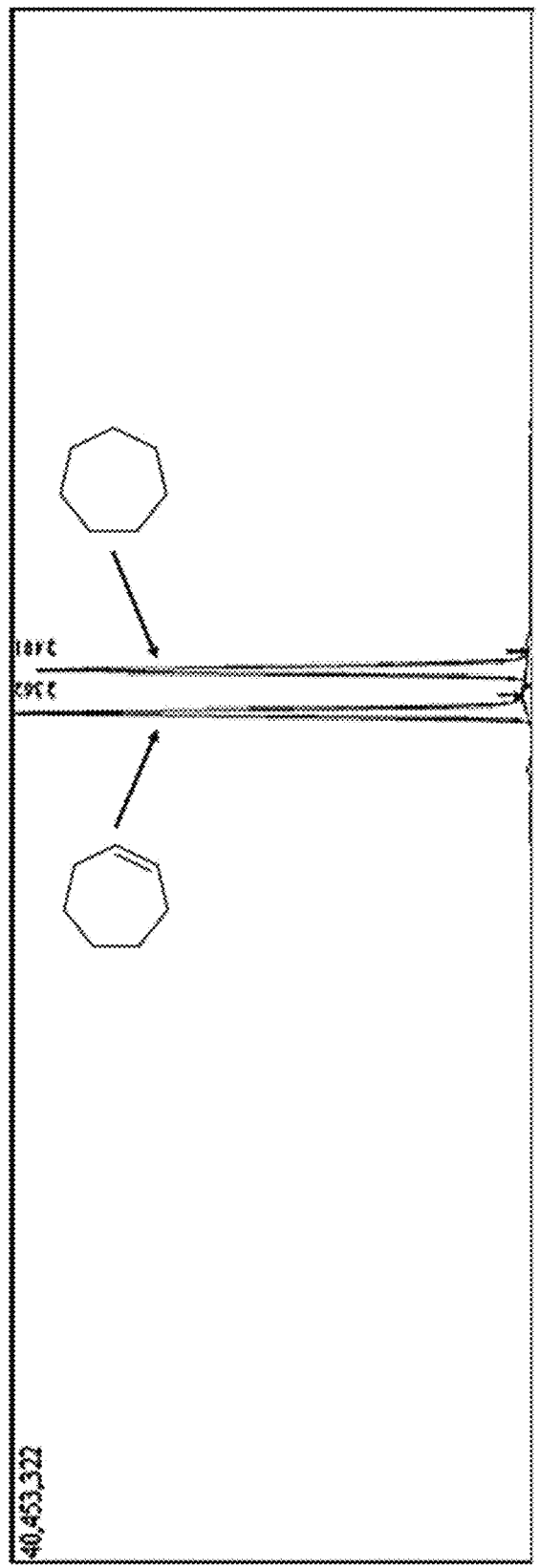
FIG. 12A shows a gas chromatograph of a catalytic hydrogenations of cycloheptene using an exemplary inventive Pd-GS catalyst.
Figure 12B:
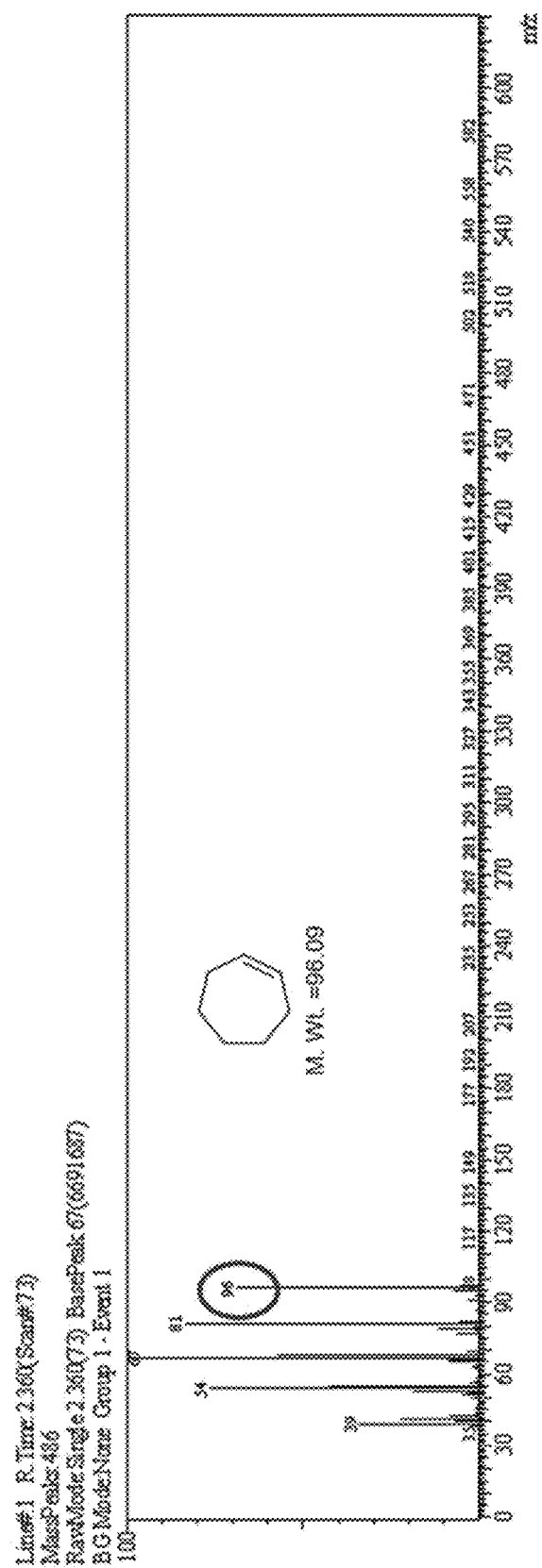
FIG. 12B shows a mass spectrum of the GC peak at an $R_t$ of 2.360 minutes from the catalytic hydrogenations of cycloheptene showing starting material.
Figure 12C:
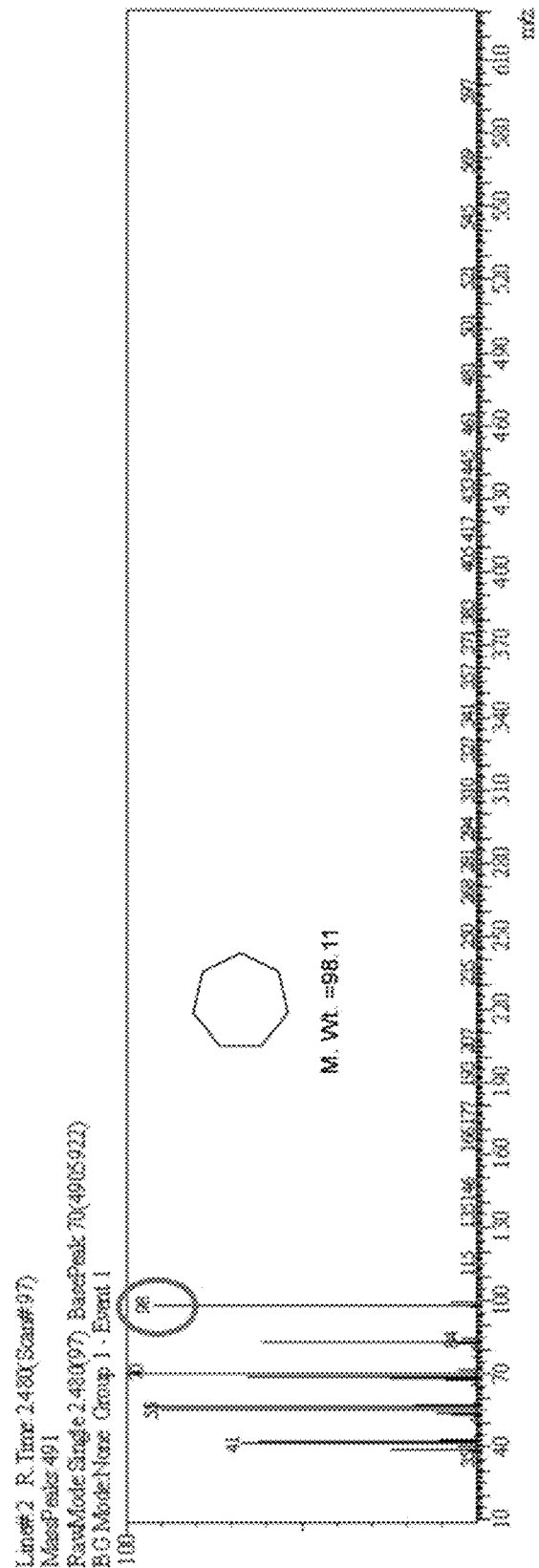
FIG. 12C shows a mass spectrum of the GC peak at an $R_t$ of 2.480 minutes from the catalytic hydrogenations of cycloheptene using an exemplary inventive Pd-GS catalyst showing hydrogenated product.

FIG. 12A to 12C show a gas chromatography (GC) spectrum of the results of a Pd-GS catalytic hydrogenation experiment of cycloheptene (FIG. 12A), a mass spectrum of the GC peak at an $R_t$ of 2.360 minutes of the starting material (unreduced, FIG. 12B), and a mass spectrum of the GC peak at an $R_t$ of 2.480 minutes showing the ionic weight of the hydrogenated product (FIG. 12C).

Figure 13A:
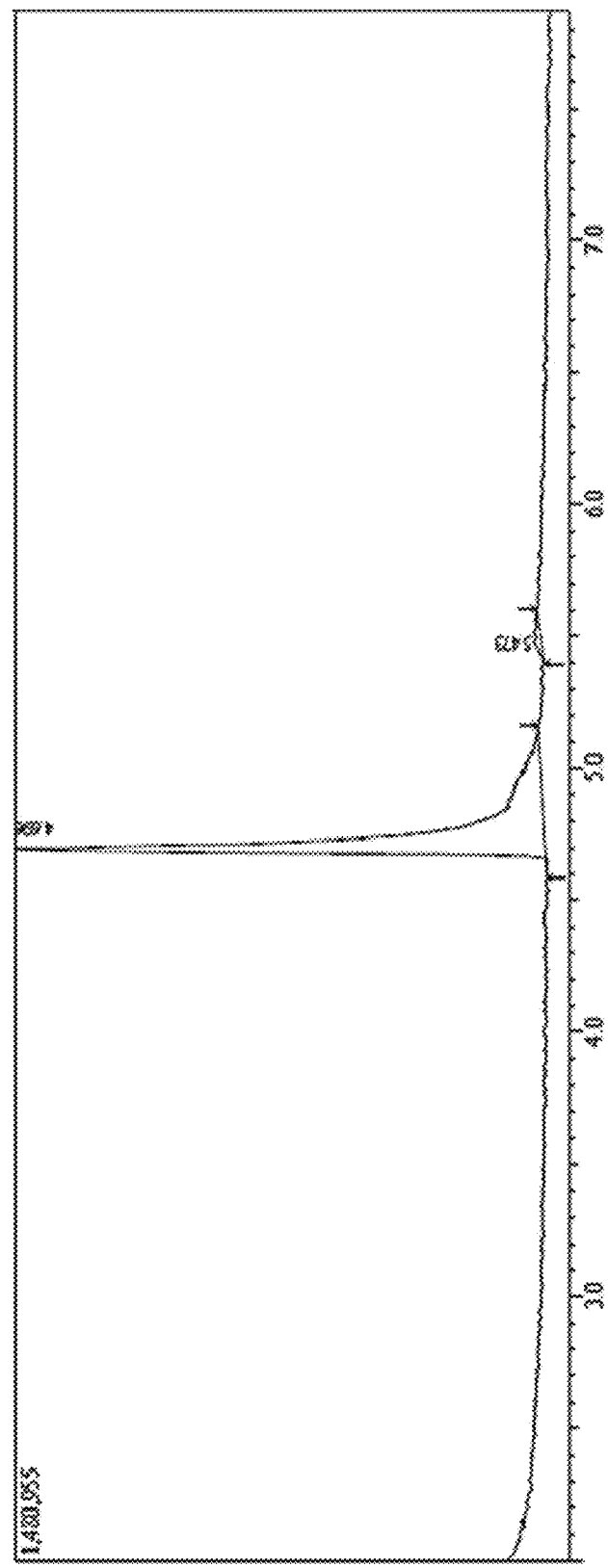
FIG. 13A shows a gas chromatograph of a catalytic hydrogenation of p-vinyl anisole using an exemplary inventive Pd-GS catalyst.
Figure 13B:
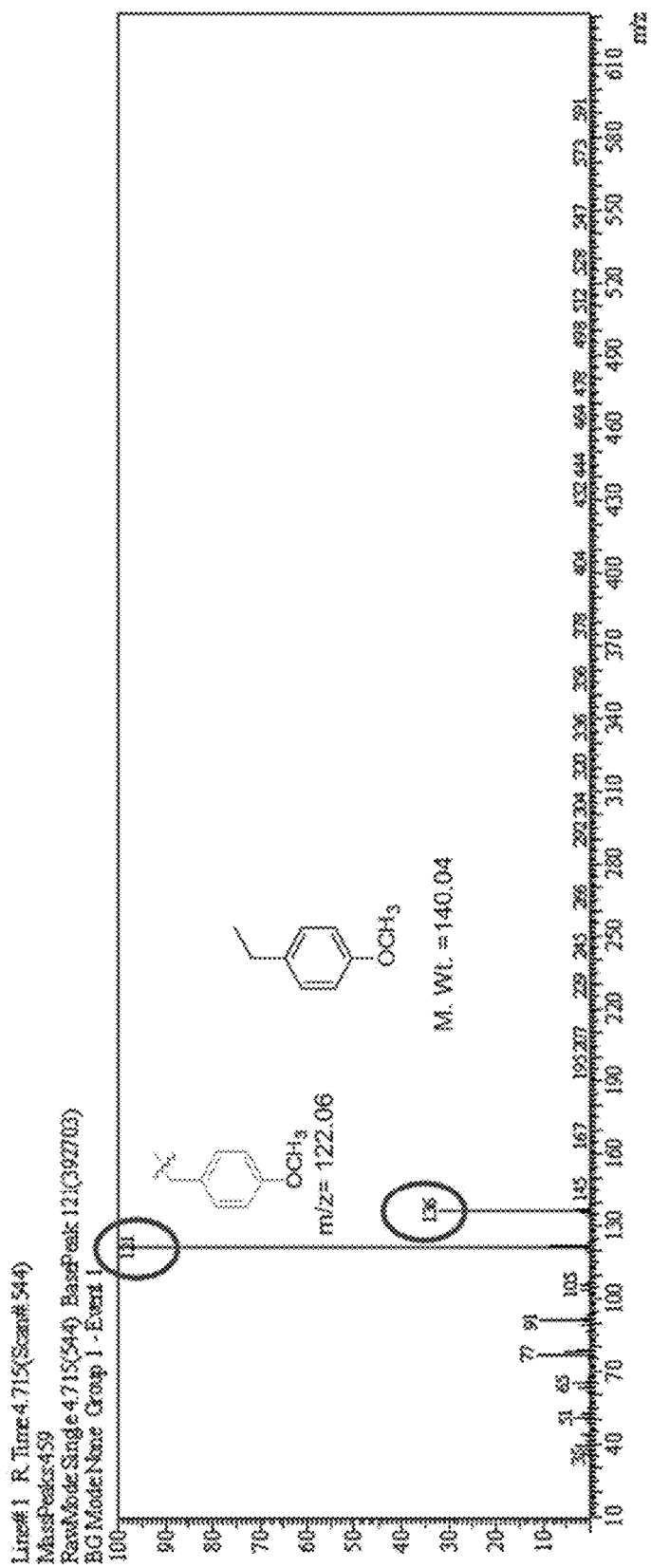
FIG. 13B shows a mass spectrum of the GC peak at an $R_t$ of 4.715 minutes of a catalytic hydrogenation of p-vinyl anisole using an exemplary inventive Pd-GS catalyst, showing hydrogenated product.
Figure 13C:
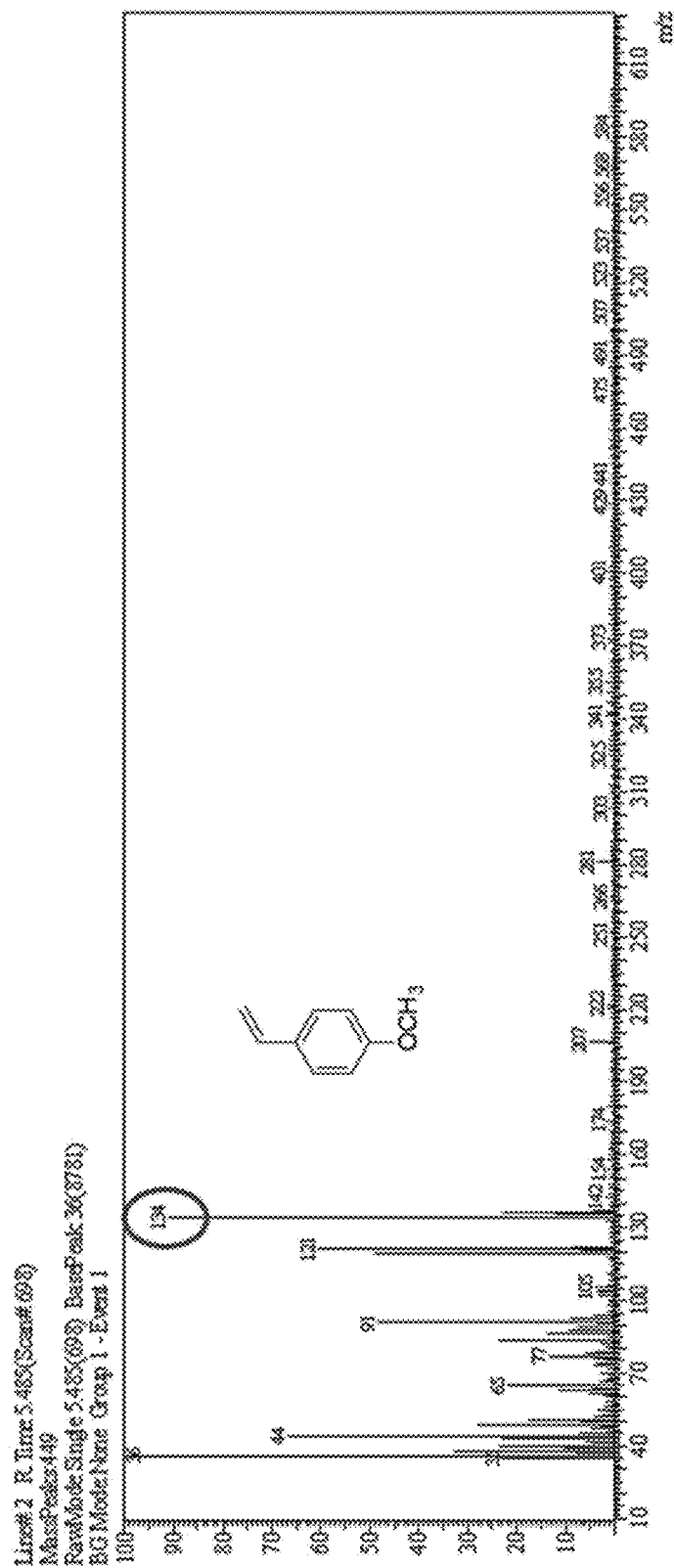
FIG. 13C shows a mass spectrum of the GC peak at an $R_t$ of 5.473 minutes of a catalytic hydrogenation of p-vinyl anisole using an exemplary inventive Pd-GS catalyst, showing starting material.

FIG. 13A to 13C show a gas chromatography (GC) spectrum of the results of a Pd-GS catalytic hydrogenation experiment of p-vinyl anisole (FIG. 13A), a mass spectrum of the GC peak at an $R_t$ of 4.715 minutes showing the hydrogenated product (FIG. 13B), and a mass spectrum of the GC peak at an $R_t$ of 5.473 minutes showing the starting substrate (FIG. 13C).

Figure 14A:
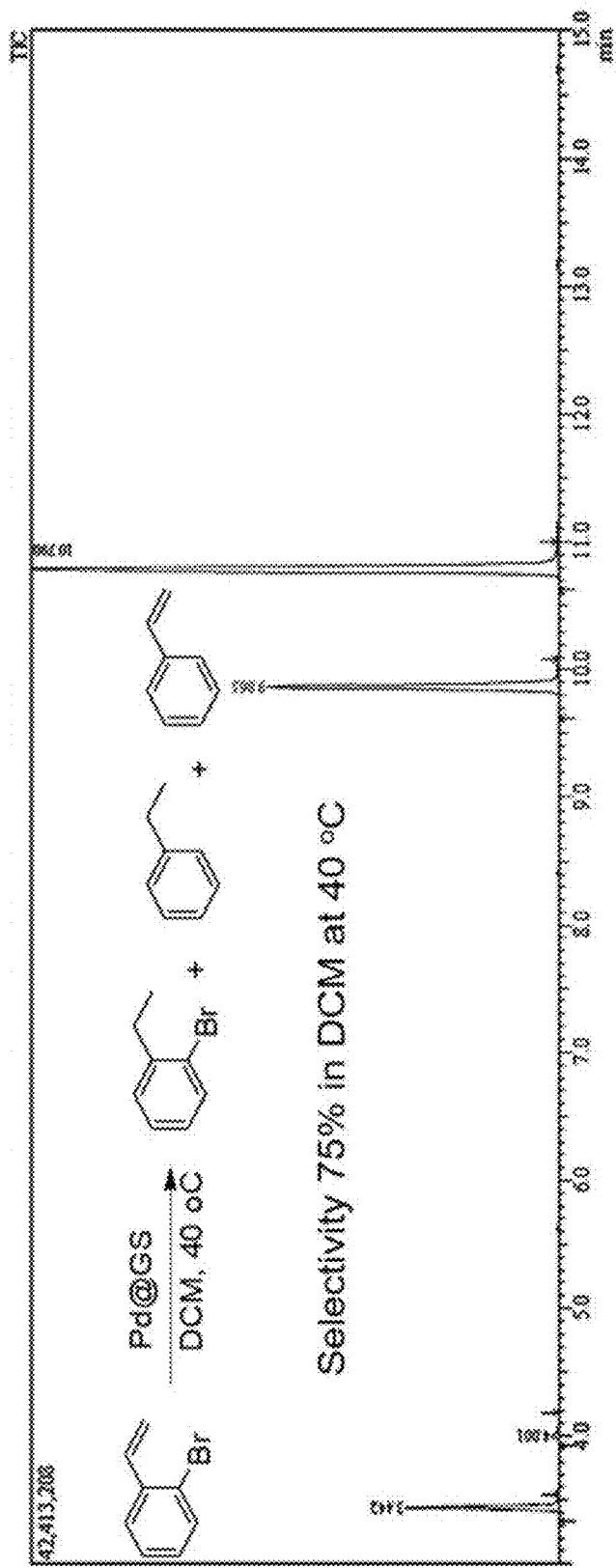
FIG. 14A shows a gas chromatograph of a catalytic hydrogenation of o-bromostyrene using an exemplary inventive Pd-GS catalyst.
Figure 14B:
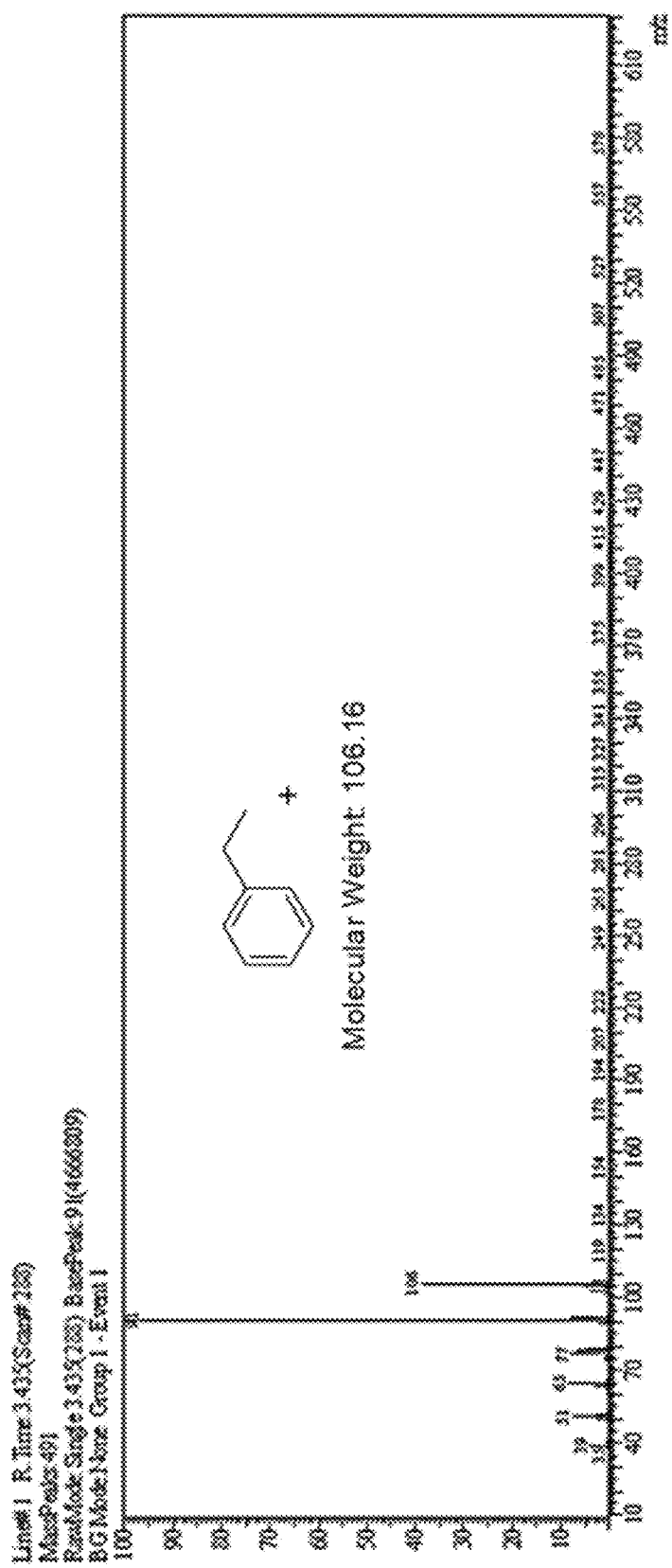
FIG. 14B shows a mass spectrum of the GC peak at an $R_t$ of 3.435 minutes of a catalytic hydrogenation of o-bromostyrene using an exemplary inventive Pd-GS catalyst showing de-halogenated, hydrogenated product.
Figure 14C:
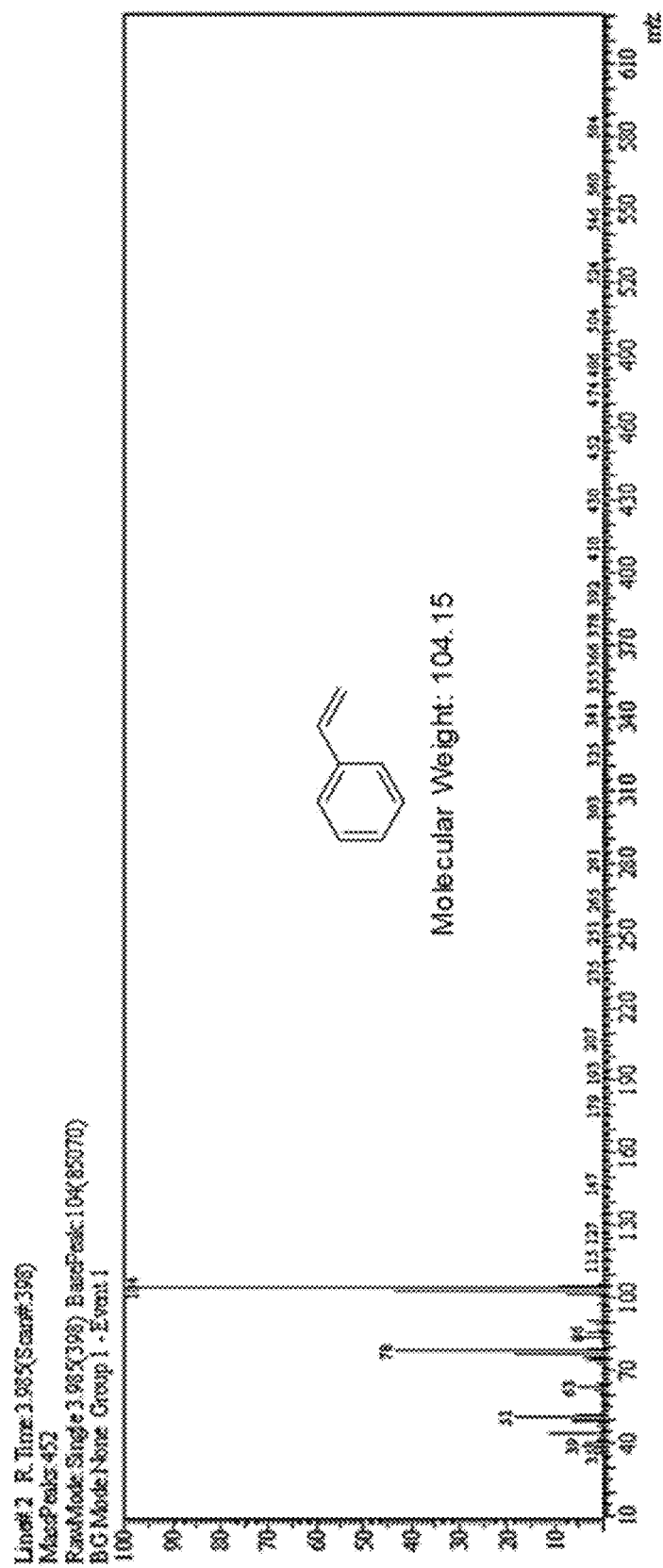
FIG. 14C shows a mass spectrum of the GC peak at an $R_t$ of 3.9853 minutes of a catalytic hydrogenation of o-bromostyrene using an exemplary inventive Pd-GS catalyst showing the de-halogenated product.
Figure 14D:
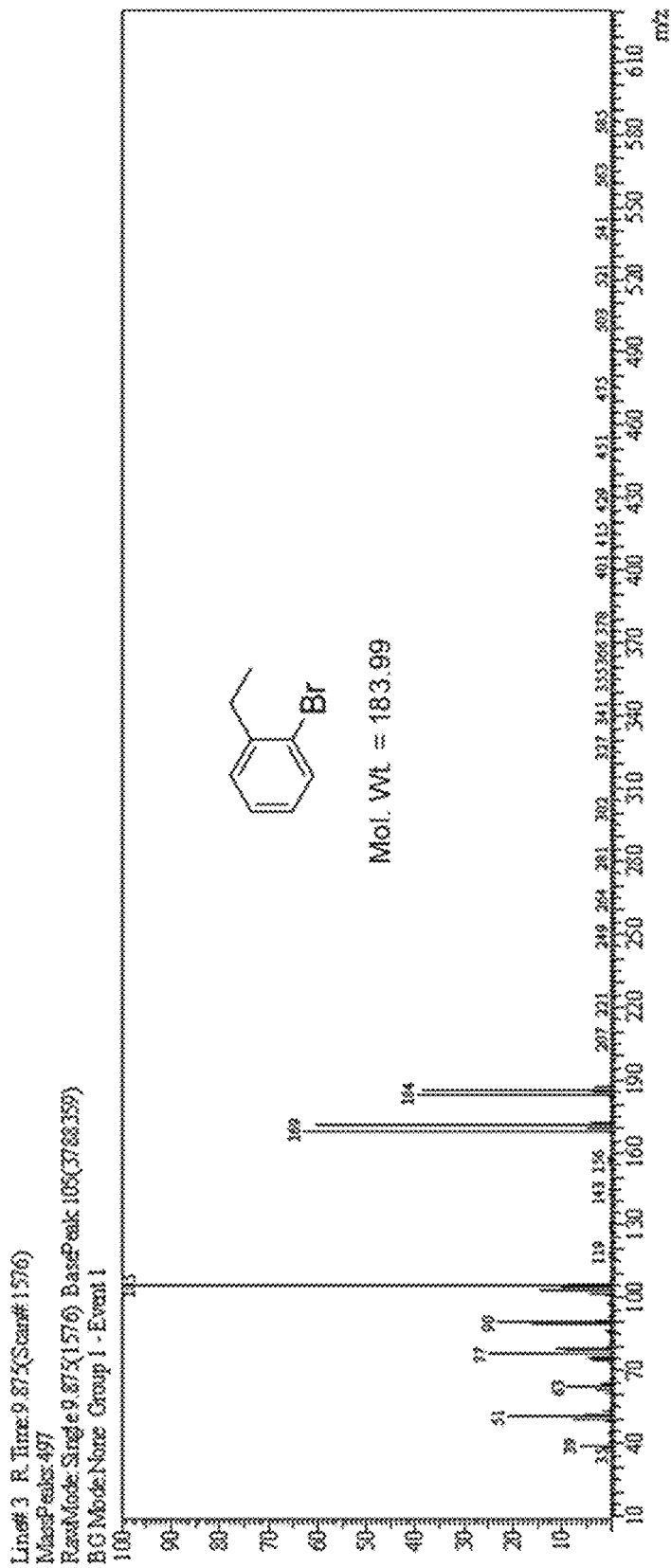
FIG. 14D shows a mass spectrum of the GC peak at an $R_t$ of 9.875 minutes of a catalytic hydrogenation of o-bromostyrene using an exemplary inventive Pd-GS catalyst showing the hydrogenated product, not dehalogenated.
Figure 14E:
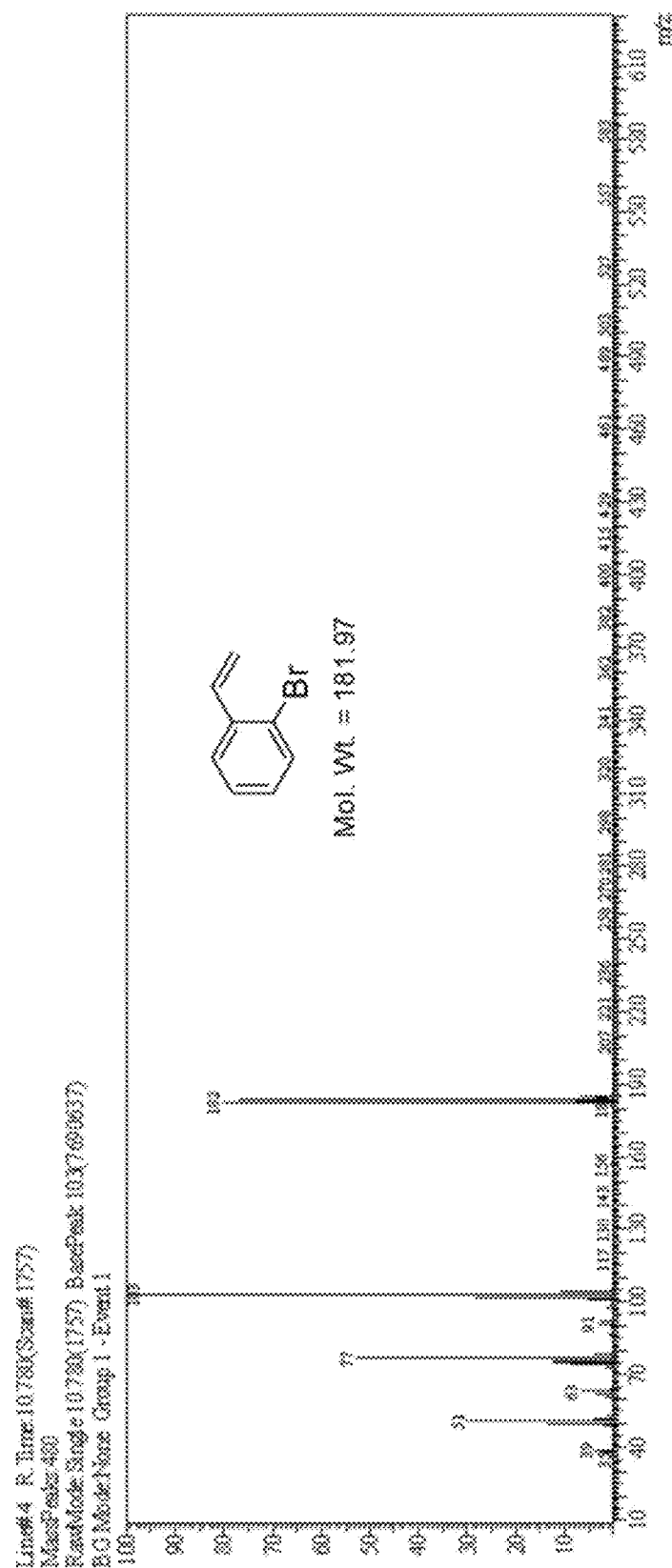
FIG. 14E shows a mass spectrum of the GC peak at an $R_t$ of 10.780 minutes of a catalytic hydrogenation of o-bromostyrene using an exemplary inventive Pd-GS catalyst showing unreacted substrate.

FIG. 14A to 14E show a gas chromatography (GC) spectrum of the results of a Pd-GS catalytic hydrogenation experiment of o-bromostyrene in dichloromethane (FIG. 14A), a mass spectrum of the GC peak at an $R_t$ of 3.435 minutes showing de-halogenated and hydrogenated product (FIG. 14B), a mass spectrum of the GC peak at an $R_t$ of 3.9853 minutes showing only de-halogenated product, retaining the olefin (FIG. 14C), a mass spectrum of the GC peak at an $R_t$ of 9.875 minutes showing the hydrogenated product, retaining the bromine (FIG. 14D), and a mass spectrum of the GC peak at an $R_t$ of 10.780 minutes showing unreacted starting material (FIG. 14E).

Figure 15A:
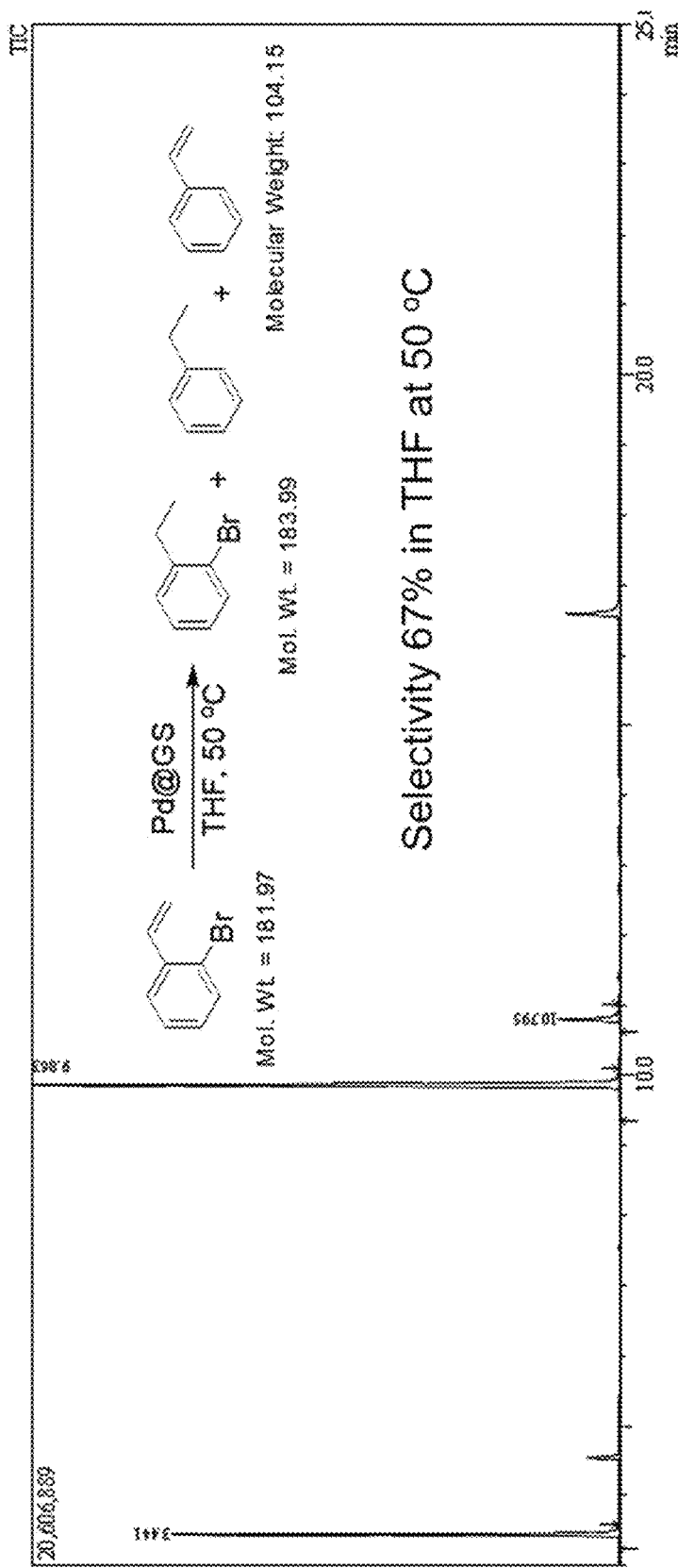
FIG. 15A shows a gas chromatograph of a catalytic hydrogenation of o-bromostyrene in THF at 50° C.
Figure 15B:
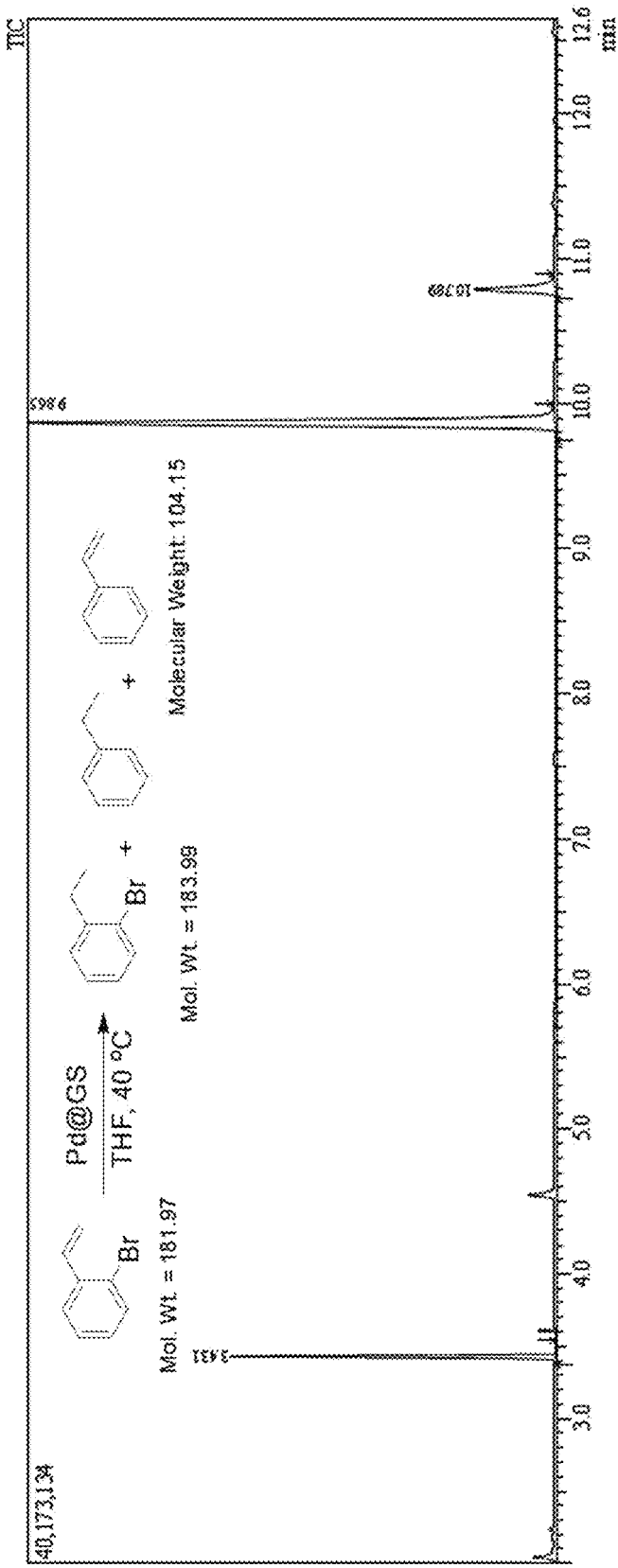
FIG. 15B shows a gas chromatograph of a catalytic hydrogenation of o-bromostyrene in THF at 40° C.

FIGS. 15A and 15B show a gas chromatography (GC) spectrum of the results of a catalytic hydrogenation experiment of o-bromostyrene in tetrahydrofuran (THF) at 50° C. (FIG. 15A) and a GC spectrum of the results of an analogous catalytic hydrogenation experiment of o-bromostyrene in THF at 40° C. (FIG. 15B).

Figure 16A:
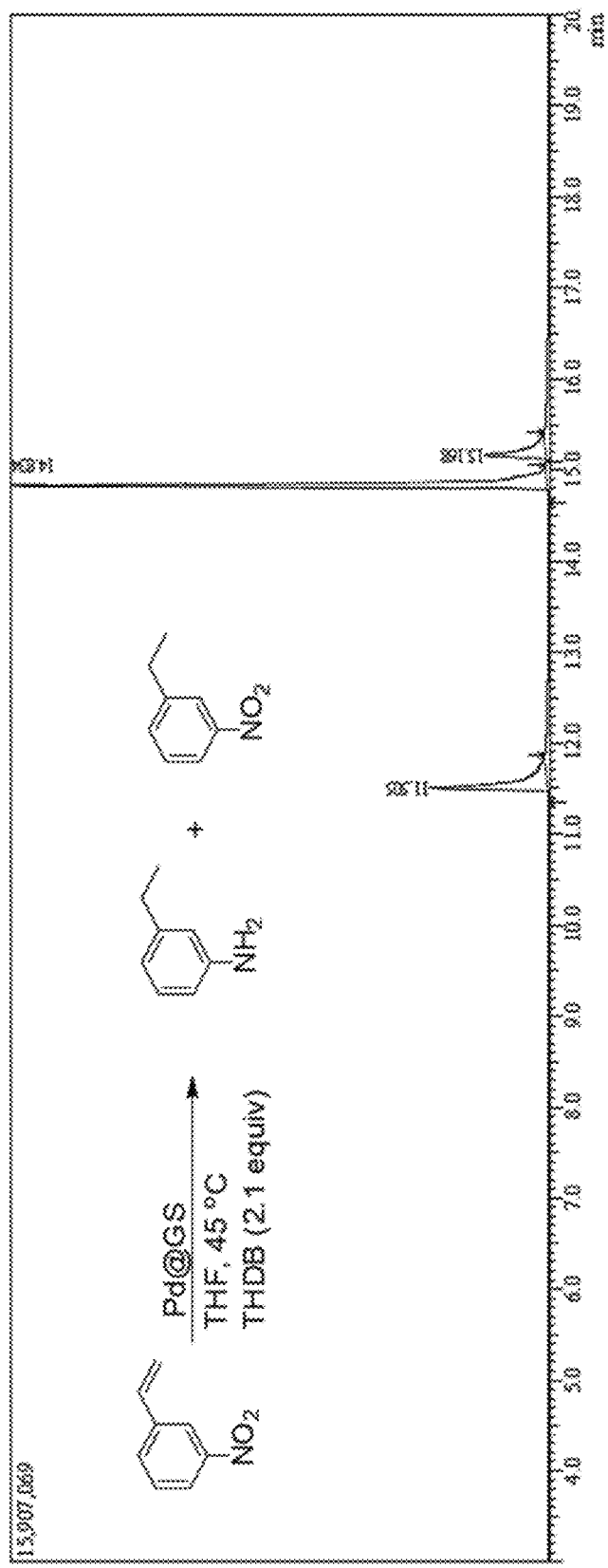
FIG. 16A shows a gas chromatograph of a catalytic hydrogenation of m-nitrostyrene using an exemplary inventive Pd-GS catalyst at 45° C. in THF with 2.1 equivalents of tetrahydroxydiboron (THDB)
Figure 16B:
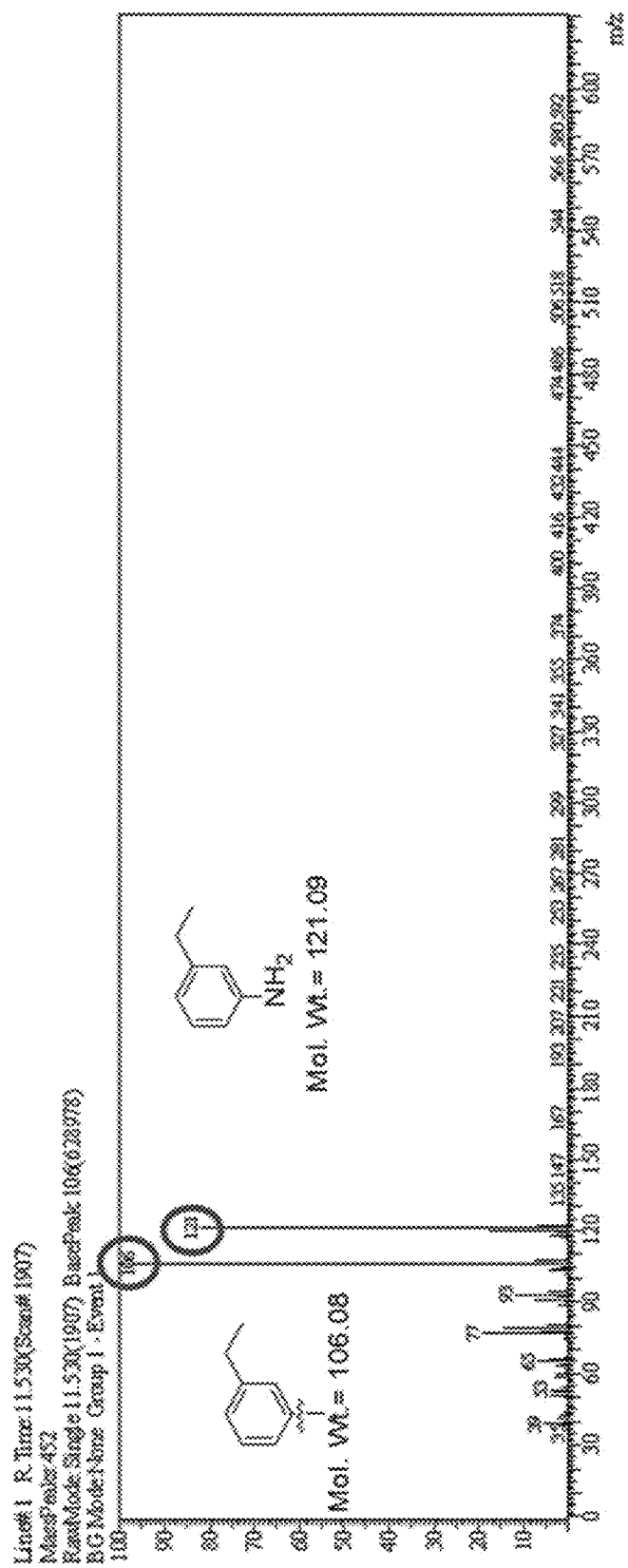
FIG. 16B shows a mass spectrum of the GC peak at an $R_t$ of 11.506 minutes a catalytic hydrogenation of m-nitrostyrene from FIG. 16A showing a reduction of both functional groups.
Figure 16C:
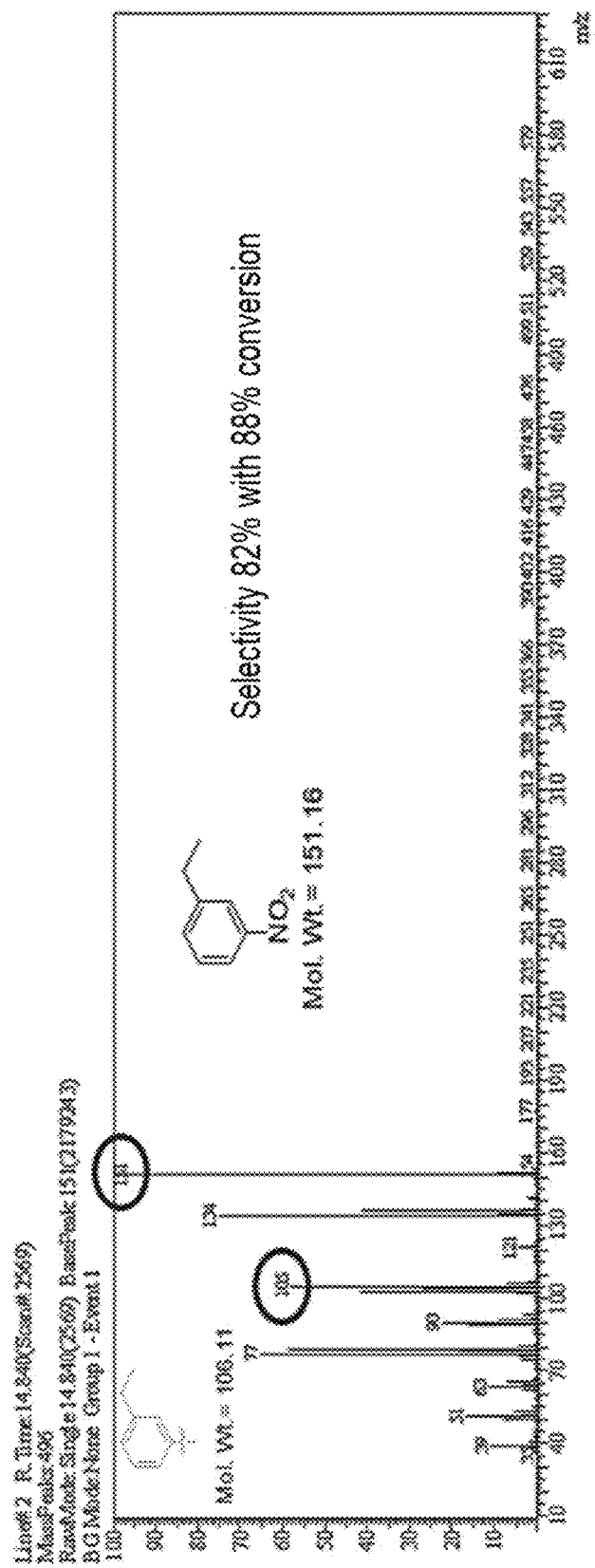
FIG. 16C shows a mass spectrum of the GC peak at an $R_t$ of 14.840 minutes a catalytic hydrogenation of m-nitrostyrene from FIG. 16A showing a selective reduction of the olefin.
Figure 16D:
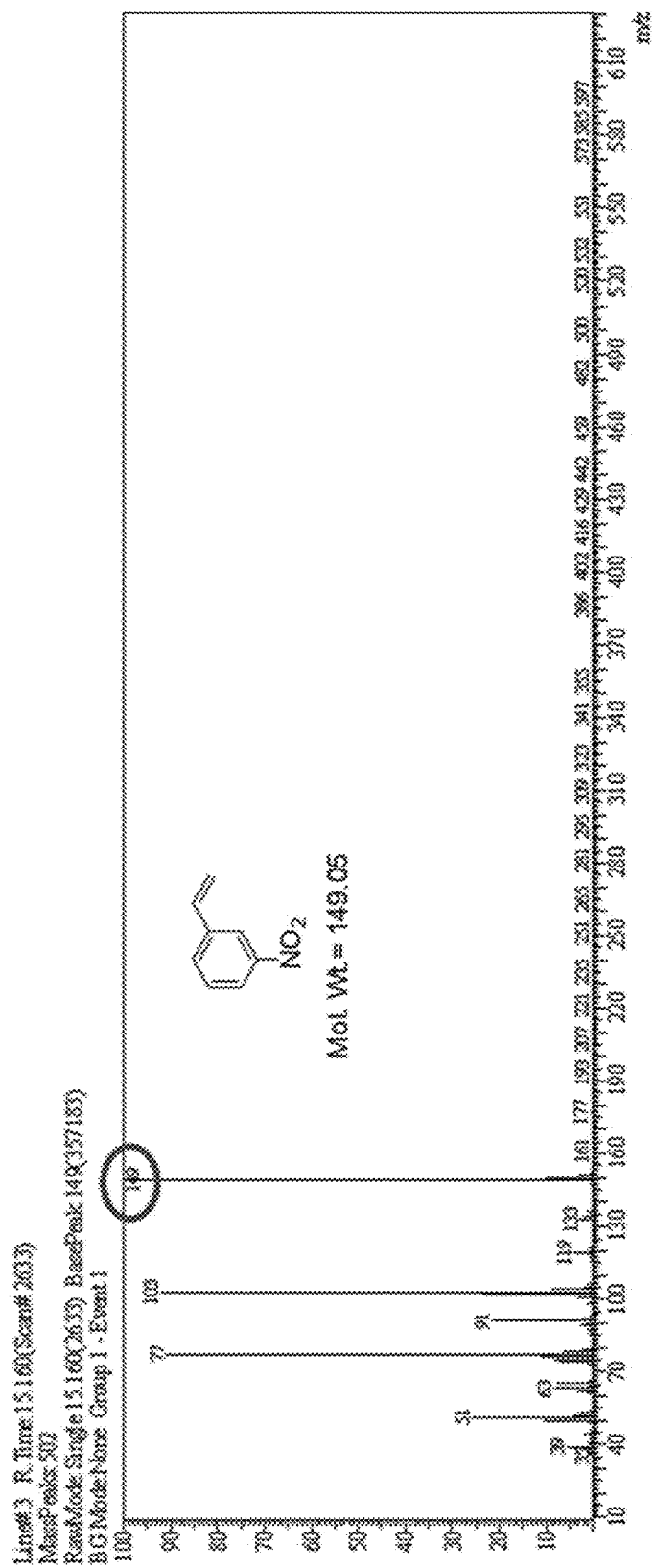
FIG. 16D shows a mass spectrum of the GC peak at an $R_t$ of 15.160 minutes a catalytic hydrogenation of m-nitrostyrene from FIG. 16A showing unreacted starting materials.

FIG. 16A to 16D show a gas chromatography (GC) spectrum of the results of a Pd-GS catalytic hydrogenation experiment of m-nitrostyrene at 45° C. in THF with 2.1 equivalents tetrahydroxydiboron (THDB) in FIG. 16A, a mass spectrum of the GC peak at an $R_t$ of 11.506 minutes showing the reduction of both functional group (FIG. 16B), a mass spectrum of the GC peak at an $R_t$ of 14.840 minutes showing a selective olefin group hydrogenation, without reducing the nitro group (FIG. 16C), and a mass spectrum of the GC peak at an $R_t$ of 15.160 minutes showing unreacted m-nitrostyrene starting material (FIG. 16D).

Figure 17A:
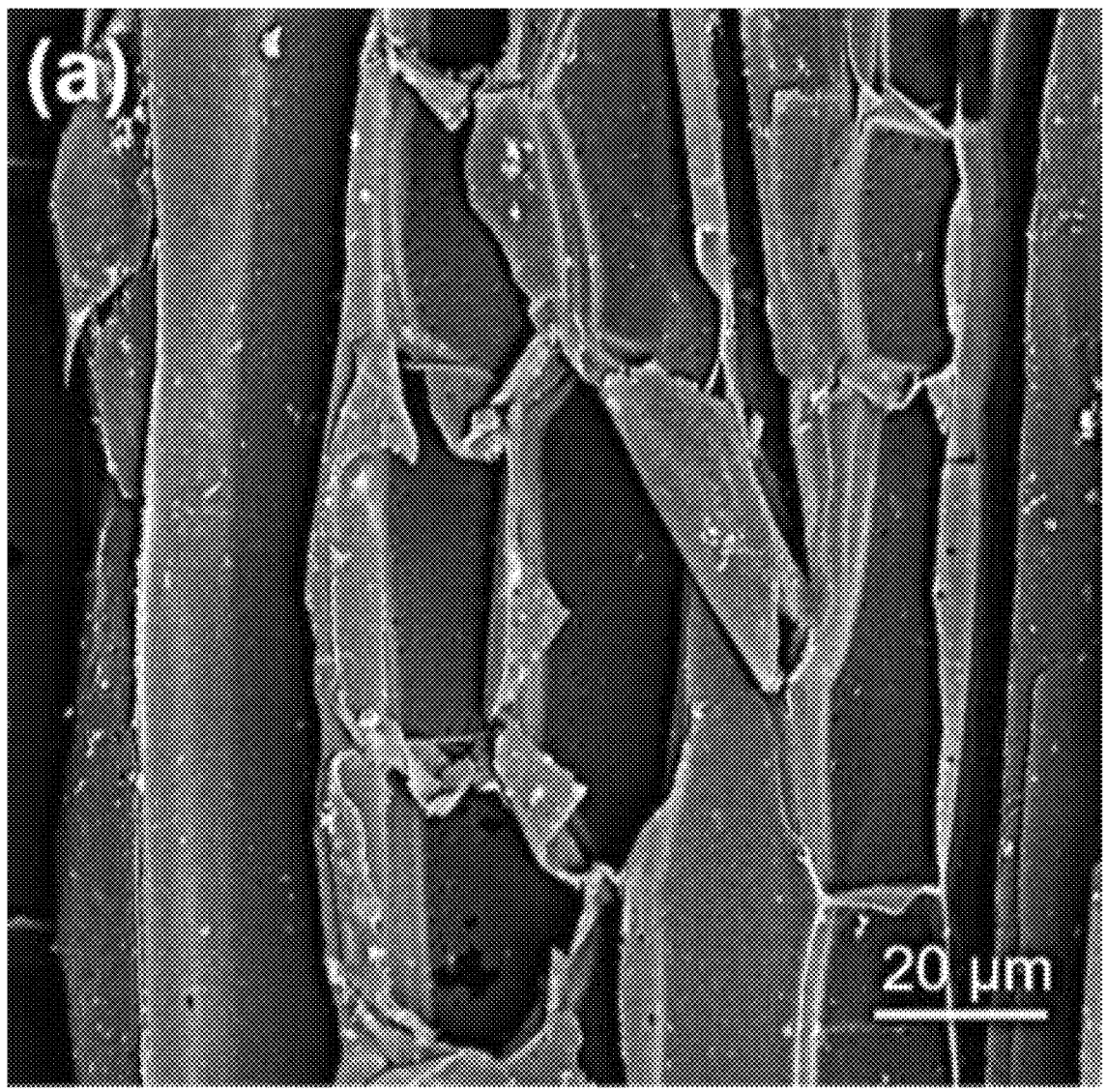
FIG. 17A shows an SEM image of an exemplary inventive Pd-GS catalyst after multiple reuses.
Figure 17B:
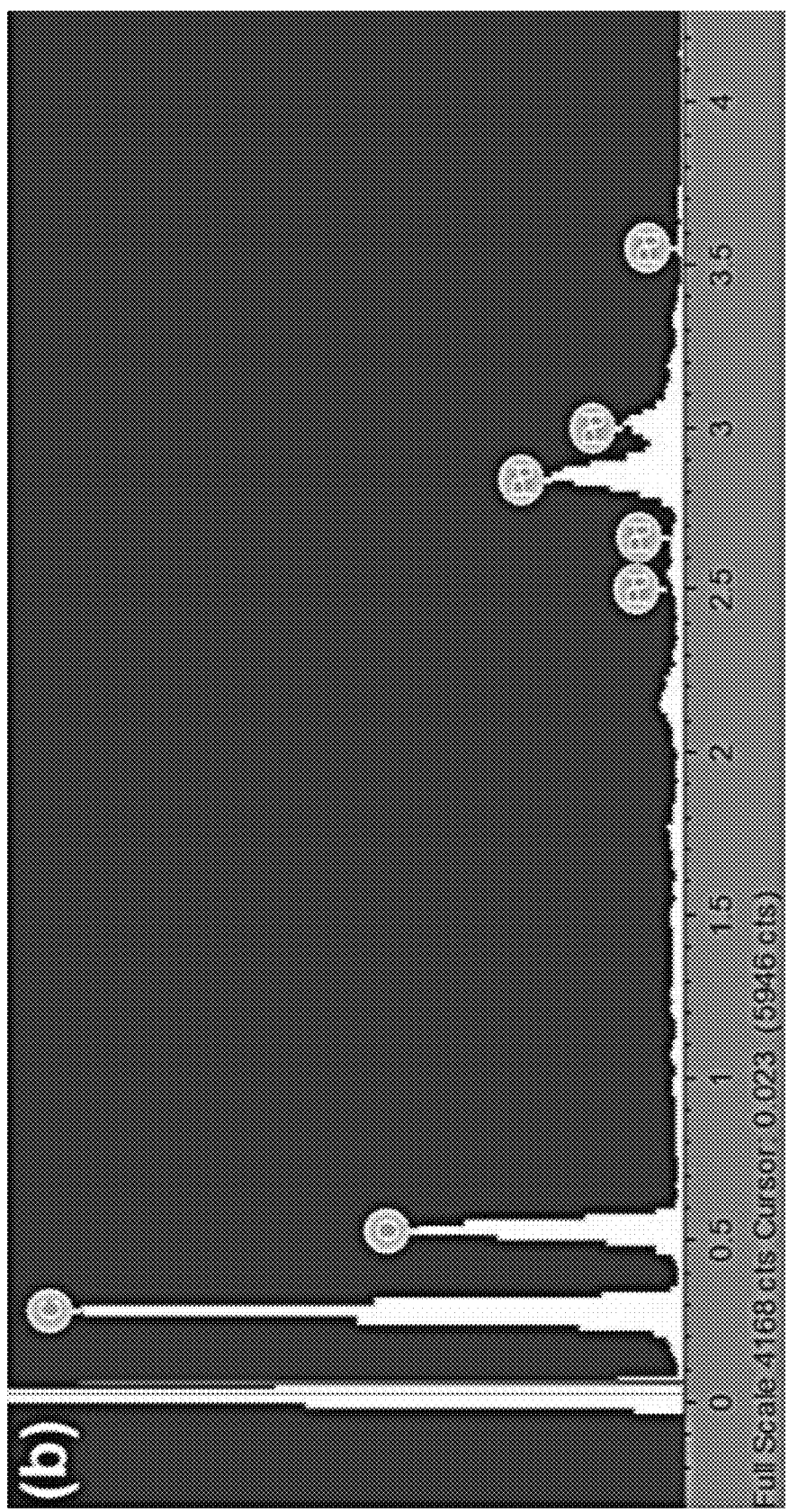
FIG. 17B shows an energy-dispersive x-ray spectroscopy (EDS, EDX, EDXS, or XEDS) plot of a reused exemplary inventive Pd-GS catalyst.

FIG. 17A shows a scanning electron microscope (SEM) image of reused palladium on jute stem (PD-GS or Pd@GS) catalyst on 20 µm scale. As can be seen from the SEM image in FIG. 17A, the jute stem matrix may include elongated strips, e.g., at least 40, 50, 60, 70, 80, 90, or 100 µm and/or up to 1000, 900, 800, 750, 700, 650, 600, 500, 400, 300, 250, 200, 150, or 100 µm, in a substantially parallel arrangement with respect to each other, separated by, e.g., at least 2.5, 5, 7.5, 10, 12.5, or 15 µm and/or up to 30, 27.5, 25, 22.5, 20, 17.5, 15, 12.5, or 10 µm. The topology of the jute stem on such scale may include perpendicular (to the global lamellar structure) breakages and/or bridges spaced by, e.g., at least 15, 17.5, 20, 22.5, 25, 27.5, 30, 32.5, or 35 µm and/or up to 75, 70, 65, 60, 55, 50, 45, 40, 35 or 30 µm. FIG. 17B shows an energy-dispersive x-ray spectroscopy (EDS, EDX, EDXS, or XEDS) of reused palladium on jute stem (PD-GS or Pd@GS).

Styrenic Alkenes Hydrogenation

Figure 18:
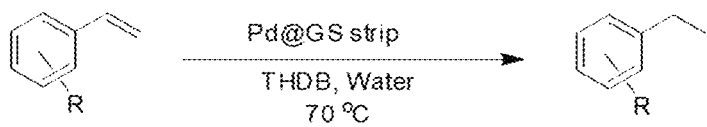
FIG. 18 shows a table of the hydrogenation using an exemplary inventive Pd-GS catalyst on styrene and its derivatives with THDB in various solvents.

FIG. 18 presents the summarized results on the hydrogenation of a number of differently substituted olefins. The optimization reactions were performed with styrene as the benchmark substrate, by varying the temperature, solvent(s), stoichiometry of reducing agent (reductant), and/or the duration. Styrene was 77% converted into its corresponding hydrogenated product within 1 hour at 70° C. in water (as solvent) with the 3.1 equivalents of tetrahydroxydiboron (THDB) with maximum selectivity, in row 1 of the table. Lowering the temperature to 50° C. decreased the conversion to 48% (row 2 of the table) with lower TOF 889 h$^{-1}$, compared to 2851 h$^{-1}$ at 70° C. Changing the solvent from water to methanol for the same reaction limited the conversion to 33%, versus 77% for water. In the presence of 3.1 equivalents of tetrahydroxydiboron (THDB) without Pd-GS catalyst, less than ~8% of styrene was converted to ethylbenzene, as seen in row 4 of the table in FIG. 18. In the case of a blank reaction in presence of Pd-GS in water but without tetrahydroxydiboron (THDB), i.e., without reducing agent, no olefin hydrogenation was detected.

The breadth of the applicability of the catalyst was examined by employing styrene with various functional groups—both electron donating and electron withdrawing groups. No significant effect of the electron donating or weak electron withdrawing groups was determined in the case of styrenic olefins. For example, p-methyl styrene and p-vinyl anisole were quantitatively hydrogenated with maximum selectivity as seen in rows 5 and 6 of the table in FIG. 18. A similar trend was observed with chloro-substituted styrene (row 7), wherein no dehalogenation was observed. However, the effectiveness of Pd-GS towards the reduction of m-nitrostyrene (where under similar reaction conditions, both olefin and nitro functional groups are prone to simultaneous reduction) showed complete conversion at 45° C., but non-selective conversion, i.e., that both functional groups were completely and simultaneously reduced within 20 hours in water.

The selectivity in the presence two or more competitive functional groups on a substrate toward hydrogenation is a challenge for which reaction conditions, including choice of solvent, may play a role. In dichloromethane, 82% of the m-nitrostyrene was converted and the selectivity towards m-nitroethylbenzene reached up to 60%. However, the remaining 40% of the m-nitrostyrene underwent a complete reduction of both the nitro and olefin functional groups to form m-aminoethylbenzene at 45° C. using 2.1 equivalents of tetrahydroxydiboron (THDB) as reducing agent.

Under similar reaction conditions in tetrahydrofuran (THF), the overall conversion of m-nitrostyrene was 88% with significant enhancement in selectivity, to 72%, to m-nitroethylbenzene as seen in row 10 of the table in FIG. 18.

Examples of the reduction of o-bromostyrene to form the corresponding hydrogenated product, o-bromoethylbenzene, at 40° C. are also shown in FIG. 18. In most cases, hydrogenation of bromostyrene occurs via hydrogenolysis, where dehalogenation is avoided, through polymerization, or through both hydrogenolysis and polymerization taking place simultaneously. Exemplary Pd-GS catalysts prepared as described herein demonstrated excellent reactivity and selectivity without hydrogenolysis or polymerization. Using water as solvent, at 40° C., the reduction of bromostyrene with Pd-GS yielded only ethylbenzene with complete debromination within 24 hours, as seen in row 12 of FIG. 18. However, when the reaction was performed at 40° C. in dichloromethane with 1.1 equivalent of tetrahydroxydiboron (THDB), the conversion achieved was about 40 mol. % in 48 hours with 75% selectivity towards the formation of o-bromoethylbenzene, with 22 mol. % ethylbenzene with 3 mol. % of styrene also forming as side products, as indicated in row 13 of FIG. 18. By changing the solvent to THF, the conversion was improved to 89% and the highest selectivity (82%) towards o-bromoethylbenzene was achieved, as seen in row 14 of FIG. 18. This level of selectivity is unexpectedly superior to results from known reduction systems under such mild reaction conditions. On increasing the temperature at 50° C., the conversion was improved to 93% with the sacrifice of selectivity to 67% o-bromoethylbenzene and 33% de-brominated product, as seen in row 15 of FIG. 18.

The o-bromostyrene reduction may be tuned to synthesize bromoethylbenzene from bromostyrene, and/or debrominated alkylbenzene, which may offer significant value in industry, i.e., preparing from target compounds from multifunctional starting materials/substrates, such as bromostyrene, by changing reaction conditions using Pd-GS catalysts.

Cyclic and Acylic Polysubstituted Alkenes Hydrogenation

A large number of olefin substrates are resistant to hydrogenation by conventional catalysis, and unfunctionalized olefins fall within this class. Various olefins were tested in probing the applicability of Pd-GS catalysts. The results are shown in the table in FIG. 19, which summarizes reactivity data from Pd-GS samples towards differently substituted linear and cyclic alkenes. For instance, the cyclic alkene cycloheptene, in row 1 of the table in FIG. 19, was hydrogenated in THF at 60° C. within 20 hours with 49% conversion. Hydrogenation was also conducted with the tri-substituted alkenes such as trans-α-methylstilbene, in row 2 of the table on FIG. 19, and ethyl trans-β-methylcinnamate, in row 3 of the table on FIG. 19, in THF at 70° C. The reduction of trans-α-methylstilbene was achieved in 33% conversion with maximum selectivity. Improved results were often observed when functionalized olefins, such as methyl-2-acetamido propionate, in row 4 of the table on FIG. 19, were employed for hydrogenation using exemplary Pd-GS catalysts.

Quinoline Hydrogenation

Figure 20:
FIG. 20 shows a table of the hydrogenation using an exemplary inventive Pd-GS catalyst on quinoline in water suing THDB as reducing agent.
Figure 20:
Figure 20:
Figure 20:
Figure 20:
Figure 20:
Figure 20:
Figure 20:
Figure 20:
Figure 20:
Figure 20:
Figure 20:

As seen in FIG. 20, inventive catalysts can be used for transfer hydrogenation of heteroaromatic compounds. Quinoline was employed as a model benchmark substrate for the catalytic hydrogen transfer reaction using exemplary Pd-GS catalysts. The progress of the reaction was monitored by TLC and GC, and the products were identified by GC-MS. First, a blank reaction was carried out in water using a Pd-GS catalyst in the absence of tetrahydroxydiboron (THDB) reducing agent. The blank reaction did not yield any hydrogenated product. When tetrahydroxydiboron (THDB) was used without catalyst under identical reaction conditions, 25% conversion was achieved. When both catalyst (Pd-GS) and tetrahydroxydiboron (THDB) were used, the yield of 1,2,3,4-tetrahydroquinoline (py-THQ) reached >99% with exclusive selectivity. Hence, a combination of catalyst and THDB may required under most circumstances to facilitate the transfer hydrogenation. The degree of sensitivity of the catalyst to varied parameters, such as solvent, temperature, amount of tetrahydroxydiboron (THDB) and catalyst, was also evaluated.

When the reaction temperature was increased to 60° C., the quinoline reduction proceeded with >99% conversion and >99% selectivity within 40 minutes. It can be observed that the turn-over-frequency (TOF) was higher (TOF 4938 $h^{-1}$, at 60° C.) compared to that at lower temperature (TOF 1574 $h^{-1}$, at 40° C.) in rows 1 and 2 of the table in FIG. 20. Changing solvent to DCM and THF affected the yield adversely, in that no hydrogenation occurred in the hydrogenation of quinoline in dichloromethane and THF, as seen in rows 3 and 4 of the table in FIG. 20. With methanol, 89% conversion was achieved, as seen in row 5 of the table in FIG. 20, which (without wishing to be bound to theory) may be ascribed to the participation of lone e-pair of the oxygen atom in methanol in the formation of the boron adduct in the transition state. Conversion was improved with increasing amount of tetrahydroxydiboron (THDB), with the best results being obtained using 4.1 equivalent of tetrahydroxydiboron (THDB). Large amounts of gaseous hydrogen may escape from the reaction medium without interacting with the metal to form metal-hydride intermediate responsible for the hydrogenation of heterocyclic compounds.

Using water as a solvent, 4.1 eq. of THDB, and a reaction temperature of 60° C., other N-heterocycles were subjected to transfer hydrogenation reaction and smoothly converted to hydrogenated product contain nitrogen ring with maximum selectivity. Although isoquinoline was quantitatively hydrogenated with >99% selectivity, as seen in row 6 of the table in FIG. 20, the isoquinoline reduction took much longer time, i.e., 5 hours, than the quinoline. In the case of polycyclic aromatic heterocycles, such as acridine, the reduction proceeded smoothly with excellent yield and selectivity, as seen in row 7 of the table in FIG. 20. The five and six-membered ring compounds, pyrrole and pyrazine, employed as substrates using the catalyst Pd-GS, were found be reactive to convert the substrate into the hydrogenated product in water with TOF 1652 h$^{-1}$ (pyrrole) and 1815 h$^{-1}$ (pyrazine), as seen in rows 8 and 9 of the table in FIG. 20. Comparing the catalytic activity of Pd-GS with standard catalyst, in rows 10 to 12 of the table in FIG. 20, it was observed that inventive Pd-GS "dip catalysts" performance was improved in terms of reactivity and re-usability over the standard catalysts used.

The heteroaromatic examples demonstrate the superior effect Pd nanoparticles immobilized onto the green support. The reactivity of the inventive Pd-GS indicates that Pd nanoparticles on the cellulosic support effectively may suppress the agglomeration of the surface-borne nanoparticles, assisting in achieving a higher catalytic activity in comparison to the similar Pd-supported systems. The exclusive selectivity towards py-THQ appears to depend on the interaction of the organonitrogen with the metal centers on the strip. The availability of a large number of aliphatic 1° and 2° hydroxyl groups on the cellulosic jute-stick may also affect the instantaneous microenvironment around the metal centers benignly. Hydrogen bonding interactions may mediate the heterocyclic ring hydrogenation faster than that of the carbocyclic ring of the substrate, resulting exclusive selectivity towards py-THQ, though the polarization of the —C≡N— aromatic bonds may play a significant role.

Numerous modifications and variations of the present invention are possible in light of the above teachings. It is therefore to be understood that within the scope of the appended claims, the invention may be practiced otherwise than as specifically described herein.

The invention claimed is:

1. A catalyst, comprising:
    a solid support matrix comprising 20 to 60 wt. % α-cellulose and 10 to 35 wt. % lignin, based on a total support matrix weight; and
    a catalytic material comprising palladium and/or platinum disposed on the support matrix,
    wherein the palladium and/or platinum is present in an amount in a range of from 0.005 to 0.5 wt. %, relative to a total weight of the catalyst.

2. The catalyst of claim 1, wherein the 20 to 60 wt. % α-cellulose and 10 to 35 wt. % lignin are from jute stems.

3. The catalyst of claim 1, wherein the support matrix comprises 10 to 30 wt. % hemicellulose, based on the total support matrix weight.

4. The catalyst of claim 1, wherein the support matrix comprises 30 to 50 wt. % α-cellulose, 15 to 30 wt. % lignin, and 15 to 25 wt. % hemicellulose, based on the total support matrix weight.

5. The catalyst of claim 1, wherein the support matrix comprises at least 90 wt. % jute stems, based on the total support matrix weight.

6. The catalyst of claim 1, wherein the catalyst comprises the palladium.

7. The catalyst of claim 1, wherein the catalyst comprises at least 90 wt. % of the palladium, relative to total metal weight in the catalyst.

8. The catalyst of claim 1, wherein the catalyst comprises at least 95 wt. % of the palladium, relative to total metal weight in the catalyst, and
    wherein at least 90 at. % of the palladium is in elemental state.

9. The catalyst of claim 1, wherein the palladium is present as nanoparticles having an average particle size in a range of from 10 to 40 nm.

10. The catalyst of claim 1, wherein the catalyst comprises the platinum.

* * * * *